United States Patent
Frank et al.

(10) Patent No.: US 10,951,704 B1
(45) Date of Patent: Mar. 16, 2021

(54) DATA OBJECT SYNC

(71) Applicants: Joseph T Frank, Albuquerque, NM (US); David Lee Trachy, Longmont, CO (US)

(72) Inventors: Joseph T Frank, Albuquerque, NM (US); David Lee Trachy, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

(21) Appl. No.: 17/123,036

(22) Filed: Dec. 15, 2020

(51) Int. Cl.
*H04L 29/08* (2006.01)
*G06F 16/27* (2019.01)
*G06F 9/455* (2018.01)

(52) U.S. Cl.
CPC ...... *H04L 67/1095* (2013.01); *G06F 9/45558* (2013.01); *G06F 16/27* (2019.01); *G06F 2009/45595* (2013.01)

(58) Field of Classification Search
CPC . H04L 67/1095; G06F 16/27; G06F 9/45558; G06F 2009/45595
See application file for complete search history.

(56) References Cited

U.S. PATENT DOCUMENTS

| | | | |
|---|---|---|---|
| 9,848,228 B1 | 12/2017 | Morris et al. | |
| 10,756,981 B2 * | 8/2020 | Sundaram | G06F 9/5044 |
| 2004/0109457 A1 | 6/2004 | Johnson et al. | |
| 2013/0024722 A1 | 1/2013 | Kotagiri et al. | |
| 2013/0042106 A1 | 2/2013 | Persaud et al. | |
| 2014/0108665 A1 | 4/2014 | Arora et al. | |
| 2014/0289839 A1 | 9/2014 | Chen et al. | |

(Continued)

FOREIGN PATENT DOCUMENTS

| | | | | |
|---|---|---|---|---|
| GB | 2503539 A | * | 1/2014 | ........... G06F 3/0605 |
| WO | WO-2014200778 A1 | * | 12/2014 | ............. G06F 21/10 |

OTHER PUBLICATIONS

Colombo et al., "Data Protection as a Service in the Multi-cloud Environment," 2019 IEEE 12th International Conference on Cloud Computing (CLOUD), Milan, Italy, 2019, pp. 81-85, doi: 10.1109/CLOUD.2019.00025. (Year: 2019).*

*Primary Examiner* — Kostas J Katsikis
(74) *Attorney, Agent, or Firm* — Kenneth Altshuler

(57) ABSTRACT

Due to slow download speeds from a cloud server to an end-user and the high costs associated therewith, described is a private environment that manages and utilizes resources provided by a public cloud and the storage horsepower of a private server. Certain embodiments envision syncing data objects across at least one cloud data bucket located in a public cloud and at least one server data bucket located in at least one private server. Certain aspects explore using a software platform that manages syncing data from a cloud data bucket to a server data bucket by way of asynchronous notifications from the cloud data bucket to the software platform. However, syncing data in the opposite direction from the server data bucket to the cloud data bucket is by way of direct syncing and not through asynchronous notifications. Conflict resolution is also described when two different data object versions are uploaded to two different data buckets before the data objects can be synced across the data buckets.

20 Claims, 20 Drawing Sheets

(56) References Cited

U.S. PATENT DOCUMENTS

| | | | |
|---|---|---|---|
| 2015/0046600 A1* | 2/2015 | Kim | H04L 67/1095 709/232 |
| 2015/0154418 A1 | 6/2015 | Redberg | |
| 2015/0222615 A1 | 8/2015 | Allain et al. | |
| 2015/0222702 A1* | 8/2015 | Salle | G06F 9/4856 709/201 |
| 2015/0373012 A1 | 12/2015 | Bartz et al. | |
| 2016/0197835 A1 | 7/2016 | Luft | |
| 2016/0378844 A1* | 12/2016 | Karve | G06F 16/2365 707/620 |
| 2018/0026985 A1* | 1/2018 | Pogrebinsky | H04L 67/10 726/7 |
| 2018/0247074 A1 | 8/2018 | Ancin et al. | |
| 2019/0306010 A1* | 10/2019 | Medam | G06F 9/542 |
| 2020/0136825 A1* | 4/2020 | Gupta | H04L 9/3213 |
| 2020/0344299 A1* | 10/2020 | Sohail | H04L 67/1097 |

* cited by examiner

DATA OBJECT SYNC

CROSS-REFERENCE TO RELATED APPLICATIONS

None

FIELD OF THE INVENTION

The present embodiments are directed to an environment that manages and utilizes public cloud resources and private server storage systems to sync data objects in data buckets.

DESCRIPTION OF RELATED ART

Public cloud systems are becoming the mainstay default data storage as well as computing services for people all over the world. There are many advantages to public cloud systems including storage and software programs readily accessible over the Internet. Whether by smart phone, laptop, tablet, or enterprise computing device, a public cloud offers easy access, security, storage space, computing power and a large number of software programs are utilizable in an end user's personal account. In this way, an end-user can simply lease the many services a public cloud system has to offer without the hassle and expense of independently owning and maintaining these computing resources.

Public cloud systems generally comprises a plurality of data servers that are distributed across distant regions networked together to form a pool of storage and computing resources all accessible by way of a web address. This remote storage and computing power is running all of the time and therefore every user's personal account is accessible 24 hours a day, 7 days a week. Public cloud systems are scalable and the data stored thereon is protected from loss and for the most part hacking. There are a variety of providers such as, AWS (Amazon Wed Services), Dropbox, Google Drive, Microsoft Azure, Oracle Cloud, IBM's SmartCloud, just to name a few.

The economic model behind public cloud storage is varied, but generally requires paying for the amount of data stored and the amount of data recalled. These charges are typically billed on a monthly basis. Though often public cloud storage providers offer a few gigabytes of storage in the cloud for free, their intention is to gain customers that desire to purchase larger amounts of storage capacity, hassle free. For that reason there are typically no upfront charges nor charges associated with moving data into the cloud. Despite the many advantages of public cloud systems over private servers/storage systems, when large amounts of data need to be stored, public cloud storage can become an expensive endeavor. Worse, because end users are typically unwilling to delete their data, the cost of storing data in public cloud systems is frequently a compounding expense.

It is to innovations related to this subject matter that the claimed invention is generally directed.

SUMMARY OF THE INVENTION

The present embodiments generally relate to an environment that manages and utilizes public cloud resources and private server storage systems to sync data objects in data buckets.

One embodiment of the present invention contemplates a content synchronization method that can be practiced in a private environment (PE) that comprises public cloud resources in a public cloud, a PE process, and at least one private server, the public cloud resources including cloud non-transitory mass storage memory (such as a bank of HDDs, SSDs, tape cartridges), cloud computer processors, data services, and at least one virtual machine (VM) that runs the PE process. Certain steps include setting up or otherwise creating a cloud data bucket in the public cloud and a server data bucket in the private server. Once the data buckets are set up, data object is stored in the cloud data bucket invoking the public cloud to asynchronously notify the PE process that the data object is in the cloud data bucket. After the notifying step, only if the PE process determines that the data object is not in the server data bucket then the PE process informs the at least one private server that the data object is in the cloud data bucket. If the informing step occurs then the private server pulls a copy of the data object from the cloud data bucket and storing the data object in the server data bucket.

Yet other embodiments contemplate a a partial content synchronization method can be practiced in a private environment (PE) comprising a first data object, a cloud data bucket, a server data bucket, a PE process and a policy database, the cloud data bucket maintained by a public cloud and the server data bucket maintained by a private server, the first data object retained in the cloud data bucket and independently in the server data bucket. The method can further selectively delete the first data object from only the cloud data bucket. A record can be made to reflect that the first data object is not to exist in the cloud data bucket but is to exist in the server data bucket. This can be followed by executing a syncing operation of all data objects between all of the data buckets in the PE wherein during the syncing operation, referring to the record. After completing the syncing operation, the first data object is retained in the PE but not in the cloud data bucket.

Another embodiment of the present invention contemplates a conflict avoidance method for synchronizing data buckets. The method can include a private environment (PE) with a public cloud and at least one private server, the public cloud comprising a PE process and a cloud data bucket that includes a first data object, the private server comprising a server data bucket that includes the first data object. A first end-user can download the first data object from the cloud data bucket and then alter the first data object to a second data object-A. While this is happening, a second end-user can download the first data object from the server data bucket and then alter the first data object to a second data object-B. The second data object-A is different from the second data object-B. The first end-user can then upload the second data object-A to the cloud data bucket (in a 'put' operation). The second end-user can upload (in a 'putting' operation) the second data object-B to the server data bucket before the private server has knowledge of the second data object-A in the cloud data bucket and before the public cloud has knowledge of the second data object-B in the server data bucket. The cloud data bucket and the server data bucket can be synced by transferring a copy of the second data object-A from the cloud data bucket to the server data bucket while transferring a copy of the second data object-B from the server data bucket to the cloud data bucket. It can be established that the second data object-B was uploaded to the server data bucket after the second data object-A was uploaded to the cloud data bucket. Accordingly, the second data object-B can be re-designated as a third data object in both the cloud data bucket and the server data bucket, the third data object is the latest data object, the first data object, the second data object and the third data object are from the same family of data objects.

DETAILED DESCRIPTION

Figure 1A:
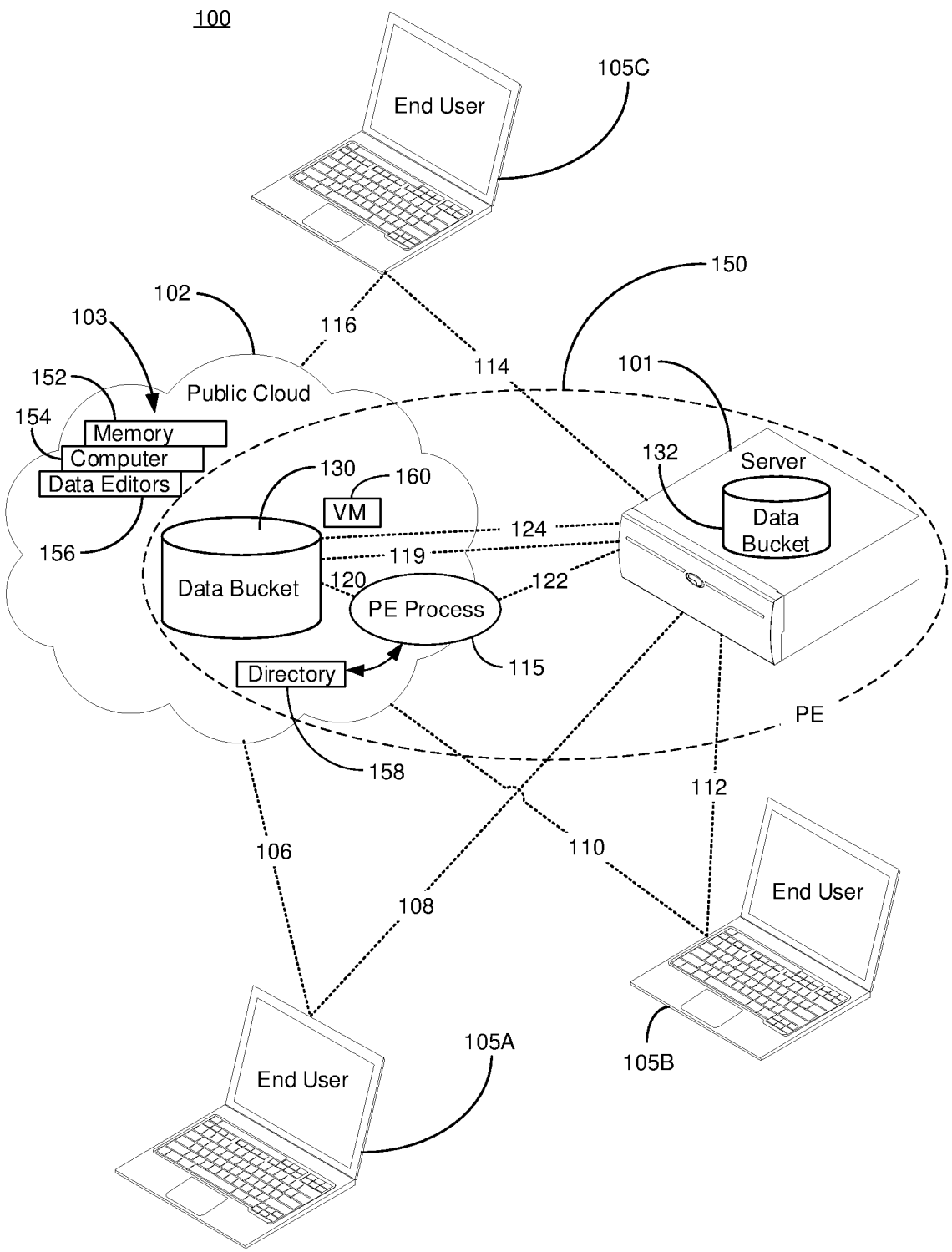
FIG. 1A is a block diagram of a cloud network storage arrangement where embodiments of the present invention can be practiced.

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of public clouds with independent data centers. The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. In what follows, similar or identical structures may be identified using identical callouts.

Certain embodiments of the present invention generally relate to a private environment that manages and utilizes resources provided by a public cloud and the storage horsepower of a private server. Certain embodiments of the present invention envision virtual storage receptacles, referred to herein as data buckets, whose content is synced across a cloud data bucket and private server data buckets. Processes employed in the present invention enhances the computing services of a cloud and private server system by speeding up and otherwise improving downloading data through replicating large data objects in a private server that can be accessed directly by way of a local area network or simply by virtue of being near an end-user. Moreover, the financial benefit of storing data in a private server is appreciable since one of the cloud financial models for storing data in a public cloud is a download fee wherein an end-user is charged proportionally to the amount of data for downloading data. Embodiments of the present invention contemplate using a software platform that manages syncing data buckets in a private server and the public cloud within the private environment. Specifically, certain embodiments envision the software platform syncing data from a cloud data bucket to a server data bucket by way of asynchronous notifications from the cloud data bucket to the software platform. Other embodiments envision syncing data from the server data bucket to the cloud data bucket devoid of asynchronous notifications by way of the software platform. In the event of a data object conflict occurring between two different data object versions uploaded to two different data buckets before the data objects can be synced across the data buckets, certain elements of the present invention provide conflict resolution to establish an order of dominance of the two different data object versions. The foregoing description illustratively describes aspects of the present invention by way of example.

FIG. 1A is a block diagram of a cloud network storage arrangement 100 where embodiments of the present invention can be practiced. As depicted, the cloud network storage arrangement 100 comprises a public cloud 102 that is communicatively connected to three end-users 105A, 105B and 105C and a private server 101. More specifically, a first end-user 105A is communicatively connected to the public cloud 102 via connection path 106 and is communicatively connected to the private server 101 via connection path 108. Likewise, a second end-user 105B is communicatively connected to the public cloud 102 via connection path 110 and to the private server 101 via connection path 112, and the third end-user 105C is communicatively connected to the public cloud 102 via connection path 116 and to the private server 101 via connection path 114. "Communicatively connected", and related terms as used herein, such as "coupled", "linked", etc., refer to elements being connected in an operational sense, and not necessarily limited to a direct physical connection or coupling. It is further considered a point-to-point connection. Two devices, or elements, are not considered communicatively connected herein simply by virtue of both being connected to a network or the world wide web, for example because there is no active or impending point to point exchange of data. Thus, for example, two devices may be couple directly, or via one or more intermediary media or devices. As another example, devices may be coupled in such a way that information can be passed there between, while not sharing any physical connection on with another. Based on the disclosure provided herein, one of ordinary skill in the art will appreciate a variety of ways in which connection or coupling exists in accordance with the aforementioned definition.

The public cloud 102 generally refers to a computer storage space and/or related management provided by a cloud storage service provider that is accessible to the public, typically for hire. Examples of a public cloud, which provides computing and storage services to the "public" for hire, include AWS (Amazon Wed Services), Dropbox, Google Drive, Microsoft Azure, Oracle Cloud, IBM's SmartCloud, i-cloud, just to name a few. Some of the resources 103 in a public cloud 102 includes mass storage memory 152, computer processing 154 and data services 156. With greater detail to the public cloud resources 103, cloud mass storage memory 152 can include storage servers, such as HDD servers and SSD servers, dispersed in different geographies, and in some cases is around the globe. The public cloud 102 leases storage space to an entity, or individual, and maintains a private directory 158 of any information stored in the least storage space. One example of a private directory 158 in the cloud is a Dynamo Database maintained by Amazon S3, which in certain embodiments exemplified below is not in the private server 101. The computer engine behind cloud computer processing 154 can include a multitude of computer processors, high-speed memory, EEPROMs, and other computer componentry that provides computing power known to those skilled in the art. Cloud computer processing 154 can also be leased to end users 105 in the form of a virtual machine (VM) 160, which appears to an end-user 105 as their private computer, however in reality it is shared computing power from the computers in the public cloud 102. Data services 156 are programs running in the cloud computer system 154 that enable an end-user 105 to condition or process their data in any number of ways. For example, data services 156 may provide a program that reduces the size of raw data (e.g., reduces high definition raw video into lower definition video that can be edited by an end-user), enhances or otherwise automatically edits raw data (e.g., changes color content of images), searches for specific things in the data (e.g., face recognition), etc. Many of the data services 156 are also for lease.

In the present embodiment, elements of the public cloud 102 are leased to a business, person or other entity and comprises a private environment (PE) 150, as depicted by the region within the dashed ellipse. The PE 150 essentially utilizes the public cloud resources 103 maintained by the public cloud 102 but further includes private storage from a private server 101. The private server can include an array of HDD's, SSD's, optical discs, tape cartridges and tape drives, or other storage elements understood by those skilled in the art. One commercial embodiment of a private server 101 utilized in the PE 150 is a Black Pearl HDD server produced by Spectra Logic Corporation of Boulder, Colo. With continued reference to the PE 150, the public cloud 102 maintains a cloud data bucket 130 and a directory 158 of data files or data objects dedicated, or otherwise assigned, to the PE 150. The private server 101 maintains a server data bucket 132 that may or may not have the same name or be a replica of the cloud data bucket 130. In the example where the data buckets all have the same name, an end-user 105 simply knows of just one data bucket having one name or namespace. A PE process 115 is a software platform running on a virtual machine (VM) 160 in the cloud 102 that is dedicated, or otherwise uniquely allocated, to the PE 150. In some embodiments, the PE process 115 contains state information about every object in the cloud bucket 130 and the server bucket 132. The state includes the physical locations of a data object, the versions of a data object, and the metadata header of each data object. The PE process 115 coordinates elements of data movement and related activities necessary to maintain data object synchronization between data buckets, such as between the cloud bucket 130 and the server bucket 132. This is depicted by communication link/path 120 (between the cloud data bucket 130 and the PE process 115) and communication link/path 122 (between the PE process 115 and the private server 101), with the data transfer over paths 119 and 124. Though the PE process 115 is shown operating on a VM 160 in the cloud 102, other embodiments are not so limiting wherein the PE process 115 can exist in the private server 101 or some other private server in the PE 150.

Figure 1B:
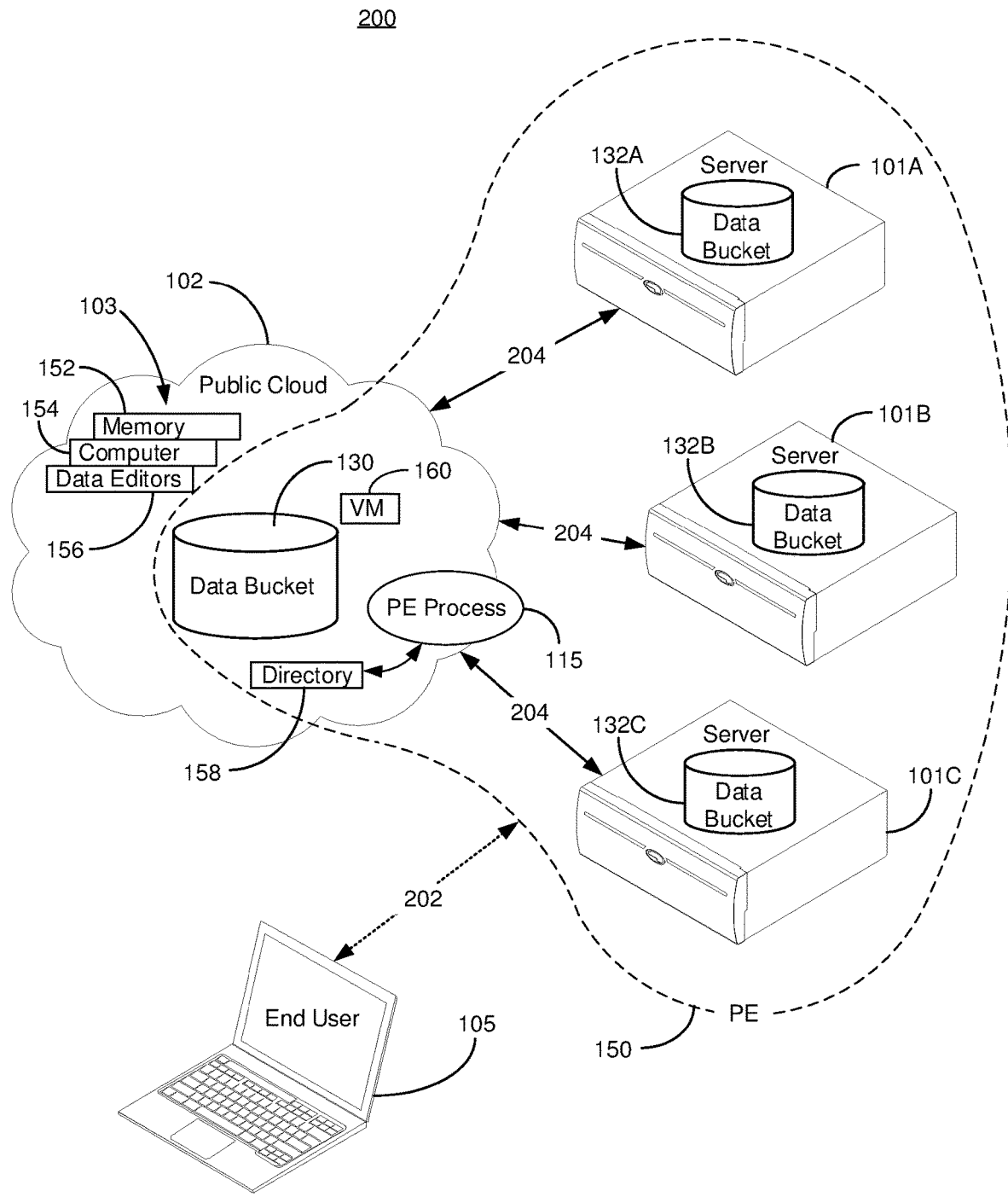
FIG. 1B is a block diagram of a cloud network storage arrangement with multiple servers in a private environment consistent with embodiments of the present invention.

FIG. 1B is a block diagram of a cloud network storage arrangement with multiple servers in a private environment consistent with embodiments of the present invention. FIG. 1B is a private environment arrangement 200, which is more or less the same as FIG. 1A but with a plurality of private servers 101A, 101B and 101C in the PE 150. Each of the private servers 101A, 101B and 101C comprise respective server data buckets 132A, 132B and 132C. The private servers 101A, 101B and 101C are connected or otherwise communicatively linked 204 with the public cloud 102, as shown. The end user 105 is in communication with one or more of the private servers 101A, 101B and 101C or the public cloud by connecting to the PE 150. In one embodiment, the end user 105 connects to a private server 105 that is geographically closest, which improves data transfer rates. Optionally, the end user 105 connects to a private server 101 that is most free (e.g., not in the midst of high bandwidth consuming data operations) to provide efficient communication and data operations. The PE 150 can manage connection between one of the private servers 101 and the end user 105 based on policy rules managed by the PE process 115 of some other controller in or affiliated with the PE 150. Optionally, the end user 105 can connect to a specific data bucket 130, 132A, 132B and 132C either intentionally or by way of an automatic routing system. The point of FIG. 1B is that the PE 150 is expandable.

Figure 2A:
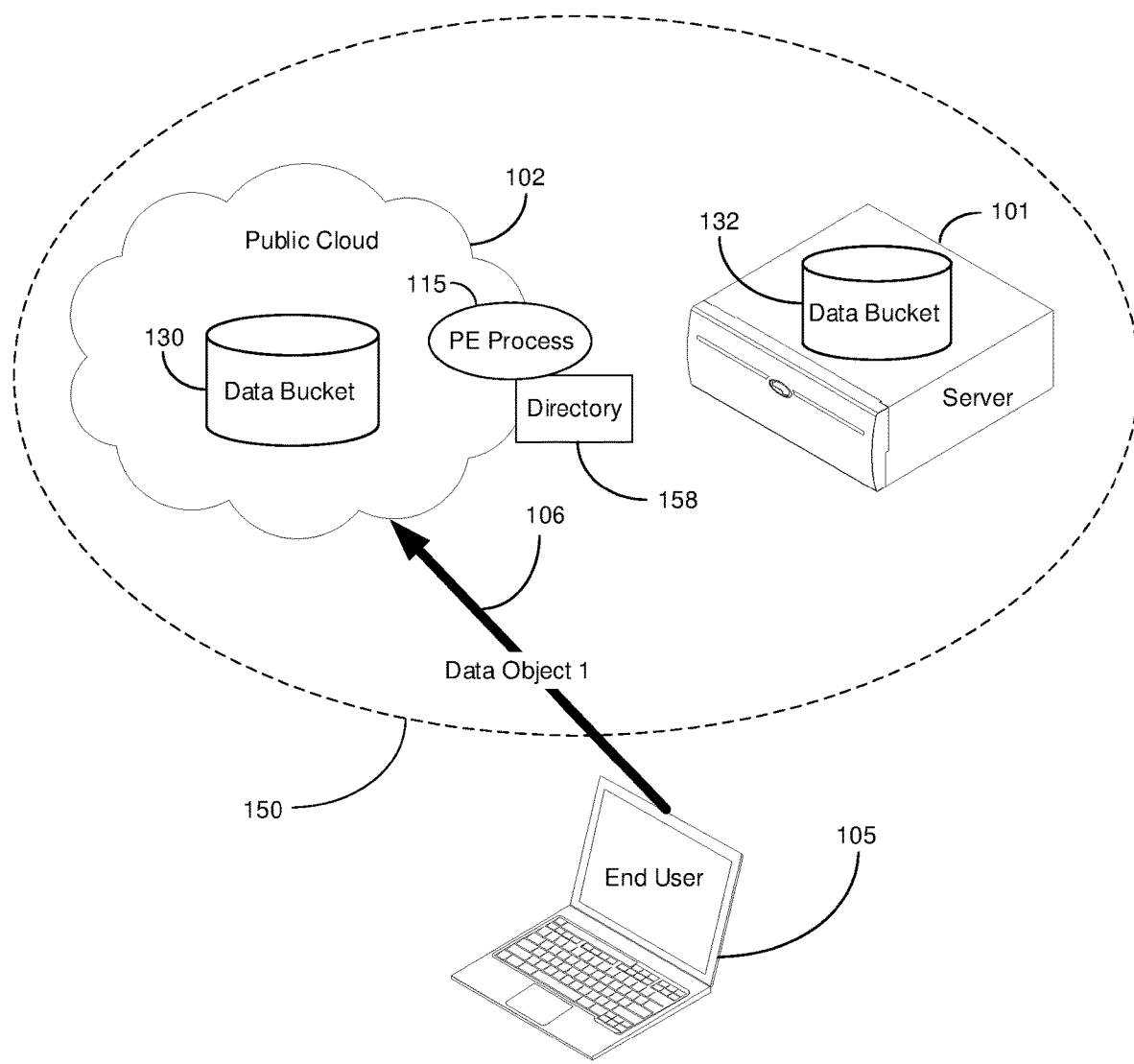
FIGS. 2A-2M are block diagrams that illustratively depict a data object process consistent with embodiments of the present invention.

FIGS. 2A-2M are block diagrams that illustratively depict a data object process consistent with embodiments of the present invention. FIGS. 2A-2M are shown in view of the method steps in the block diagram of FIGS. 3A and 3B. As shown in FIG. 2A, an end-user 105 is uploading Data Object 1 to the public cloud 102, and more specifically to the cloud data bucket 130, via connection path 106 (shown by the thick arrow). For purposes of example, let Data Object 1 be a data object with a massive amount of raw high definition video data associated therewith, such as a terabyte of data. FIGS. 2A-2M are shown in conjunction with the method steps arranged in FIGS. 3A and 3B.

Object storage is an architecture that stores data objects. A data object is different than (not equivalent to) a data file used in a traditional hierarchical file system and certain embodiments herein that employ data objects are not applicable to files that function in a traditional file system environment. Object storage bundles one or more pieces of data in a structured manner with all associated metadata and designates it as a data object. Object data is a distinct unit of data that includes the unstructured data itself, the variable amount of metadata and a global unique identifier, or key. Versions of data objects can exist to deal with changes to object data, however data objects (in and of themselves) cannot be modified. Object storage is differentiated from file storage because object storage adds comprehensive metadata to the object whereby the tiered file structure used in file storage is eliminated. Hence, data objects can be managed by way of a flat address system instead of a hierarchical address system used in a file system. Object storage further differentiates from file storage systems in that object storage systems allow retention of massive amounts of unstructured data. For example, object storage systems can be used for storing photos on Facebook or songs on Spotify. One of the design principles of object storage is to abstract some of the lower layers of storage away from the administrators and applications, required in file storage. Thus, data is exposed and managed as objects instead of files or blocks. Advantages to objects is that they contain additional descriptive properties, which can be used for better indexing or management. Object storage adds a unique identifier within a bucket, or across the entire system, to support much larger namespaces and eliminate name collisions. Certain embodiments leverage the ability for object storage to explicitly separate file metadata from data to support additional capabilities, as opposed to fixed metadata in file systems (filename, creation date, type, etc.). In certain embodiments objects can be different from its content data. In other words, a data object can be a small string of information intrinsically and uniquely tied to its content data but can be independent from its content data. For example, a data object can be in one location and the data object's content data can be in a separate location.

The term end-user 105 refers to an entity that accesses the PE 150 for a number of different purposes including storing data, retrieving data, viewing data information, setting up data buckets, setting up data policies, etc. An end-user 105 can be a person accessing the PE 150 via a GUI (graphical user interface) or a computer application accessing the PE 150 via a server running an API, just to name several examples. Though an end-user 105 is envision to set up a cloud data bucket 130 and/or a server data bucket 132, other embodiments envision the creation or setting up of a data bucket occurring automatically based on policy rules previously established in the PE 150.

A data bucket as used herein refers to a unique namespace that virtualizes a pool of physical non-transient storage devices. Accordingly, a data bucket is essentially a logical data receptacle that in turn accommodates a logical grouping of data objects, which does not necessarily specify anything about the storage used to store those data objects. Certain embodiments consider a data bucket not necessarily being tied to any specific individual storage device (such as an HDD, SSD, tape cartridge); hence, in certain instances can include portions of a plurality of different storage devices, the portions collectively comprising the data bucket storage space. Each data center, cloud storage service, or other storage facility can comprise a plurality of data buckets. In certain embodiments, a data bucket is dedicated to a specific collection of related data (e.g., data collected in a specific date range, a specific event, for specific user, for specific region, for specific task or set of tasks, etc.). Because a data bucket is essentially a virtual storage container, at a minimum, it need only have a unique identification. A data bucket can be a predetermined size (i.e., capable of containing a predefined number of data bits) that is the same size as other data buckets or optionally a different size from other data buckets. Certain embodiments envision a data bucket being adjustable in size to accommodate a changing amount of data stored to the data bucket.

Figure 2B:
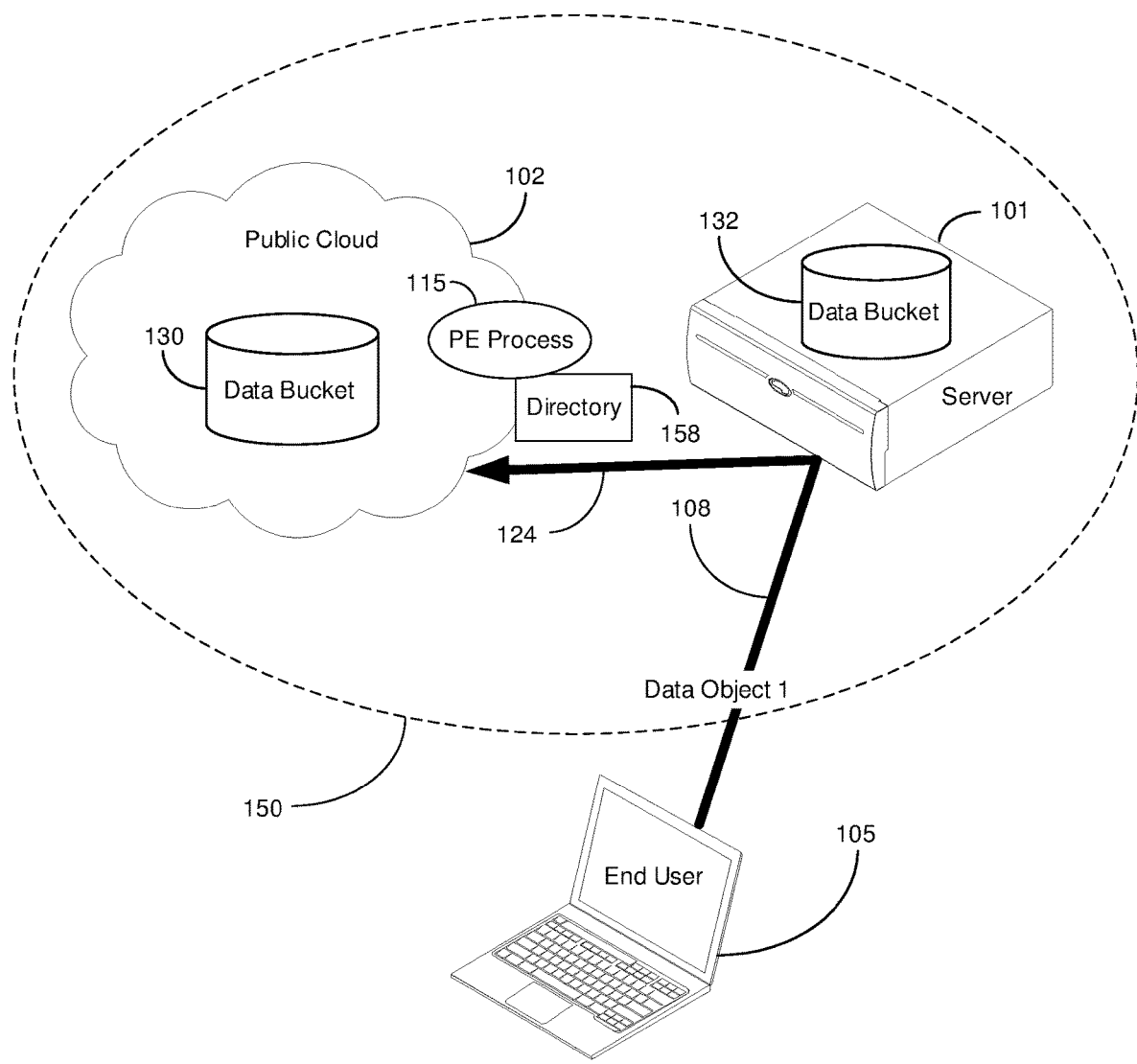

FIG. 2B shows a line drawing block diagram of an optional embodiment of a data object being sent and stored to a cloud data bucket 130 by way of a private server 101 consistent with embodiments of the present invention. As shown by this depiction, the end user 105 accesses the cloud data bucket 130 via a web address (not shown) by connecting through the private server 101 (data path 108) and being routed to the cloud data bucket 130 (server to cloud data path 124). Accordingly, in this embodiment the end user 105 uploads Data Object 1 to the cloud data bucket 130. In certain embodiments, the server data bucket 132 is accessible to any end user 105 that is allowed to go through the firewall at the account where the server data bucket 132 is hosted (assuming that there is a firewall). Likewise, the cloud data bucket 130 can be set up to only be accessible to an end user 105 that has the rights to the cloud data bucket 130. Certain embodiments envision the end user 105 being unaware of that they are connecting to the cloud data bucket 130 by way of the private server 101. Other embodiments contemplate that the end user 105 is not aware of where any of the data buckets are hosted. Regardless of whether accomplished via FIG. 1A or FIG. 1B, Data Object 1 gets stored to the cloud data bucket 130 as DO1C ("DO1C" is a shorthand for "Data Object 1 in the cloud data bucket 130"), step 302, FIG. 3A. For purposes of discussion, a Data Object 1 residing in the cloud data bucket 130 is denoted as DO1C wherein the "C" is for cloud, and server data bucket 132 is denoted as DO1S wherein the "S" is for server.

Certain embodiments, described later, leverage the concept that the end-user 105 is only aware of their data bucket and not the cloud data bucket 130 or the server data bucket 132. In this way, if the end-user 105 is sending Data Object 1 to their data bucket, which happens to pass through the private server 101 first, Data Object 1 may or may not get stored to the server data bucket 132 and synced to the cloud data bucket 130 over a pathway that does not include the PE process 115. Also, in the present example the syncing operation can be done without human intervention, such as if syncing is based on policy rules set up for at least the cloud data bucket 130, the server data bucket 132, and/or the PE 150.

Figure 2C:
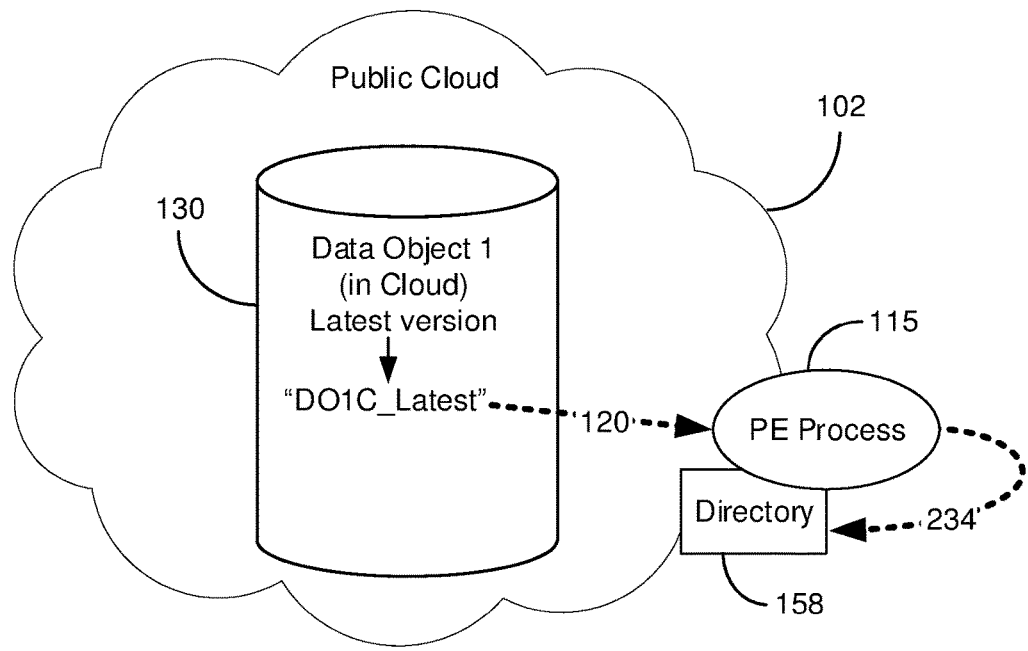

FIG. 2C is a block diagram line drawing depicting updating a cloud directory 158 with a data directory record entry, such as metadata corresponding to DO1C_Latest in accordance with certain embodiments of the present invention. In this embodiment, as soon (or shortly after) the cloud data bucket 130 is completely in possession of DO1C_Latest, metadata corresponding to DO1C_Latest is sent to the PE process 115 and then to the cloud directory 158 via the PE process 115, as shown by the arrow 234. In other words, the PE process 115, which manages a cloud directory 158 in this embodiment, adds DO1C_Latest meta data entry into the directory 158, see arrow 234, step 304.

Figure 2D:
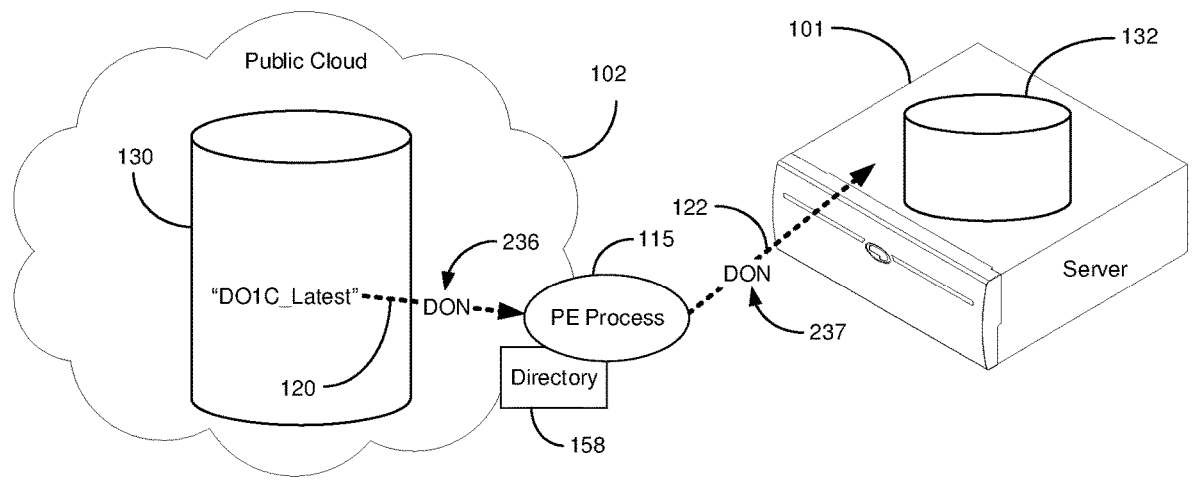

FIG. 2D is a block diagram line drawing illustratively depicting the process of replicating Data Object 1 in the at least one server 101. The cloud data bucket 130 newly contains Data Object 1 in accordance with step 302 and thereby commences with the process of replicating Data Object 1 to the server data bucket 132. To this end, a new data object notification 236 ("DON") is sent to the PE process 115 informing the PE process 115 that DO1C_Latest has been newly added to the cloud data bucket 130, step 306. The notification pathway 120 is a dashed arrow to indicate that an asynchronous notification is being made. The solid lines are used herein to indicate data object transfer and the dotted lines indicate commination and small amounts of elated data, such as meta data. An asynchronous notification is a notification of a new data object that is not on a scheduled time interval but rather occurs whenever a new data object is stored to the cloud data bucket 130. Moreover, asynchronous notifications, as used in this embodiment, originate from the public cloud 102 or cloud data bucket 130 and not from the PE process 115, which could optionally routinely query the cloud data bucket 130 for any new data objects (in a synchronous manner). Once the DON 236 is received, the PE process 115 determines that Data Object 1 is not in the server data bucket 132 (target data bucket) by querying the directory 158 as reflected in the question step 308. If Data Object 1 is not in the server data bucket 132 based on the information in the directory 158 ("No" arrow), then the PE process 115 sends the DON 237 to the server 101, step 310. Of course if Data Object 1 is already in the server data bucket 132, then the syncing process terminates as shown by the "yes" step 316.

Figure 2E:
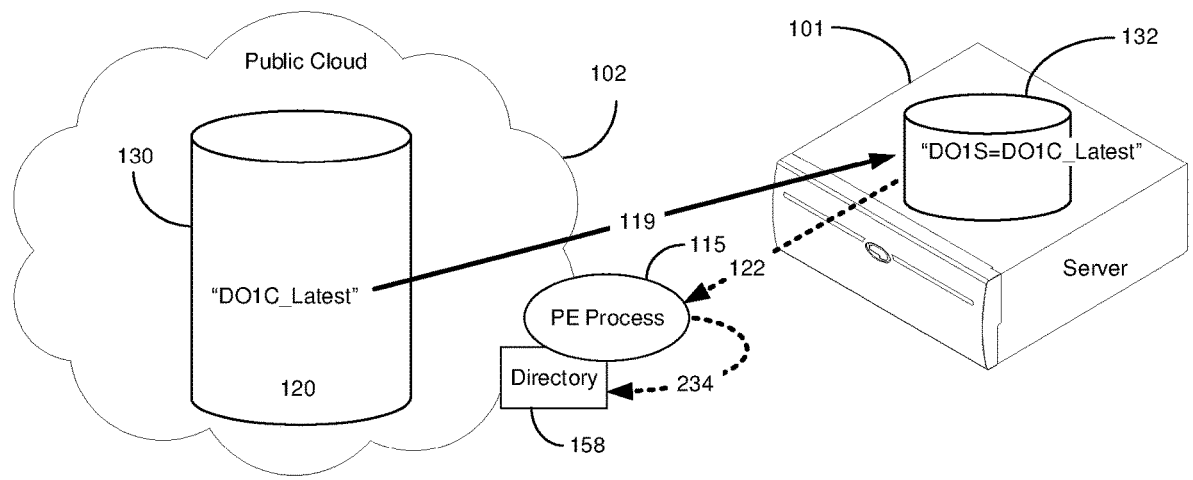

FIG. 2E is a block diagram that illustratively depicts replicating Data Object 1 in the Server Data Bucket 132 consistent with embodiments of the present invention. After the server 101 is notified of new Data Object 1, the server 101 "pulls" DO1S_Latest from the cloud data bucket 130 to the server data bucket 132 over pathway 119 (shown as a solid line to indicate data object transfer) where Data Object 1 is stored, step 312. As shown, DO1S=DO1C_Latest (Data Object 1 in the server data bucket 132 is the same as the latest version of Data Object 1 in the cloud data bucket 130). Once Data Object 1 (DO1S) is stored in the server data bucket 132, metadata about DO1S is sent to the PE process 115 over pathway 122, where a record is entered into the directory 158 that DO1S is present in the server data bucket 132, step 314. In this embodiment, the server 101 does not retain a record of DO1S locally but rather uses the directory 158 managed by the PE process 115 in the cloud 102 to obtain both the existence and the location of DO1S. In other words, in this embodiment the server 101 must go to the cloud 102 to obtain record information of the very object DO1S stored locally 101 because there is no record of DO1S in the server 101. This automatic transferring of data is referred to herein as a syncing operation between the cloud data bucket 130 and the server data bucket 132. Syncing of DO1C_Latest between the cloud data bucket 130 and the server data bucket 132 may or may not include syncing the data object content associated with DO1C_Latest. Synchronization means that data objects being received by a cloud bucket 130 are replicated to the private server data bucket 132, or some other private on-premise data bucket and vice-a-versa. In certain embodiments, synced data buckets provide the same data objects in each data bucket wherein each data bucket is managed separately by independent servers (whether near one another or far away in distant locations). In other embodiments, synced data buckets provide the same data objects and their corresponding object data content in each of the data buckets, however each of the data buckets are managed separately by independent entities, or on separate servers that can be dispersed throughout the world. Some embodiments of the present invention envision the activity of syncing data buckets (or initiating the syncing process) occurring essentially immediately, that is between a fraction of a second to less than a minute from when a data object is first received in one of the data buckets.

Figure 2F:
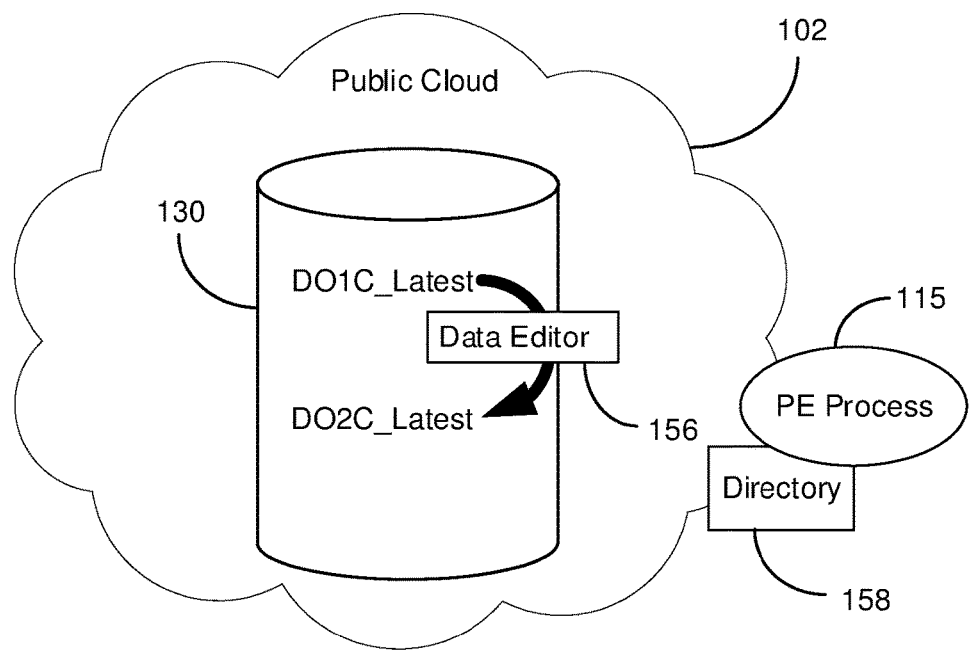

With reference to the example of Data Object 1 being raw high definition video data (see FIG. 2A), FIG. 2F illustratively depicts a line drawing block diagram of cloud data editing the high definition data consistent with embodiments of the present invention. In certain instances, a raw high definition video data object can be expensive and time-consuming to download and edit (expensive because public cloud servers 102 charge by the bit for downloading data and time consuming because downloading massive amounts of data over the internet can be slow). Accordingly, the present embodiment contemplates changing DO1C_Latest into a lower definition video data object, DO2C_Latest, to improve downloading and editing speeds. As shown, DO1C_Latest is processed into a new lower resolution data object DO2C_Latest by one of the many data editors 156 operating within the public cloud 102. Because the new lower resolution data object DO2C_Latest is a new data object, the processing step 302 applies. This data editing/processing step can be accomplished automatically by way of a policy rule (previously set up by an end-user 105) for data objects contained in the cloud data bucket 130. Optionally, this data editing/processing step can be accomplished with the intervention of an end-user 105. Though this example explores converting a high definition video to a lower definition for the video, altering DO1C_Latest can mean any number of alterations from face recognition data editors to color and contrast, for example. In other words, the data editor 156 is certainly not limited to the operation of lowering video definition to reduce data size, but rather is one of many possible examples of data conditioning software/algorithms maintained and run within the public cloud 102.

Figure 2G:
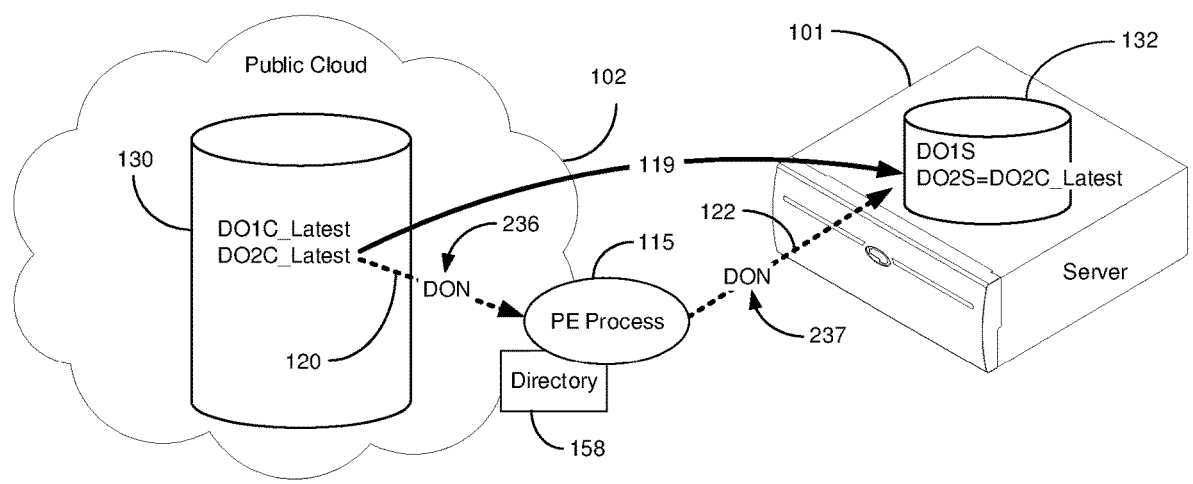

As shown in FIG. 2G, in response to the new data object notification for DO2C_Latest, the PE process 115 syncs the server data bucket 132 with the latest version of Data Object 2 from the cloud data bucket 130. The process for syncing DO2C_Latest to one or more private servers 101 follows the same steps described in conjunction with FIGS. 2C-2E. In short, metadata corresponding to DO2C_Latest is entered into the directory 158 via the PE process 115, step 304, and a new DON 236 corresponding to DO2C_Latest is sent from the cloud data bucket 130 to the PE process 115 over the dotted line pathway 120, step 306. The PE process 115 make sure that DO2 is not in the private server 101, step 308, before sending the DON 237 over the dotted line pathway 122 to the server 101, step 310. In certain embodiments the DON 237 is sent directly to the server data bucket 132. Next, the private server 101 pulls Data Object 2 into the server data bucket 132; DO2S equals DO2C_Latest, step 312. A data directory entry (e.g., metadata) corresponding to DO2S is entered into the directory 158 via the PE process 115, step 314.

Figures 2H, 2I:
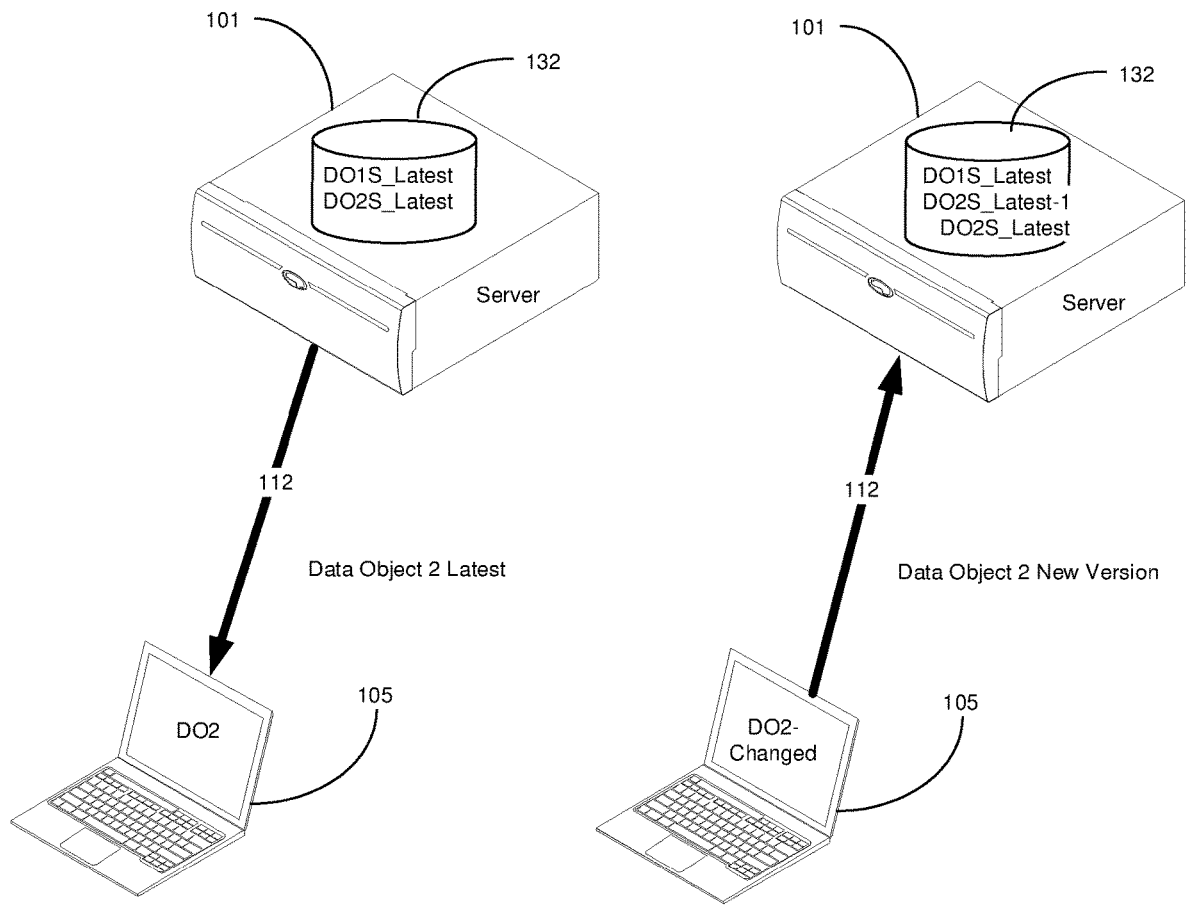
Figure 3A:
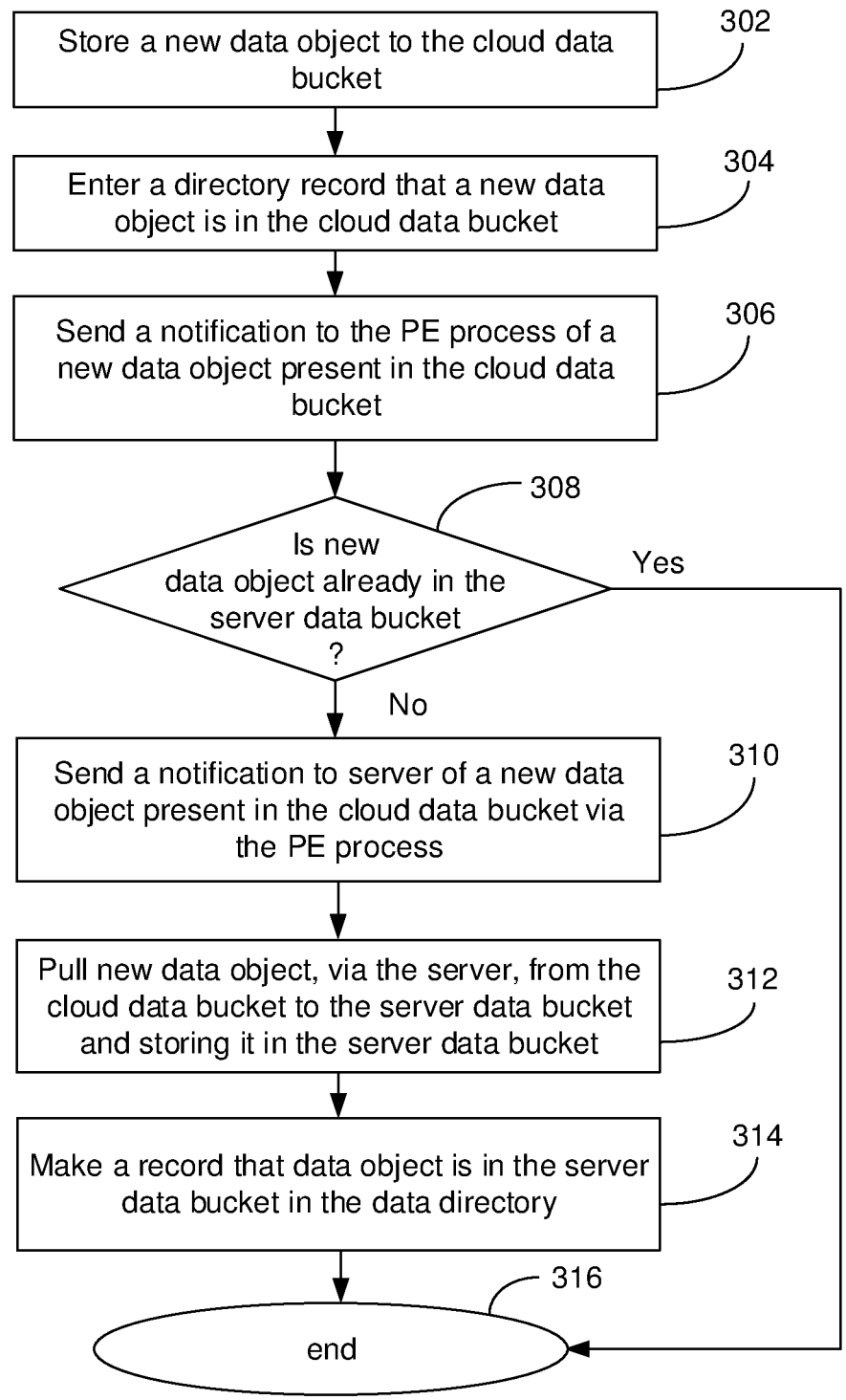
FIGS. 3A and 3B are block diagram flow charts of syncing method embodiment consistent with embodiments of the present invention.
Figure 3B:
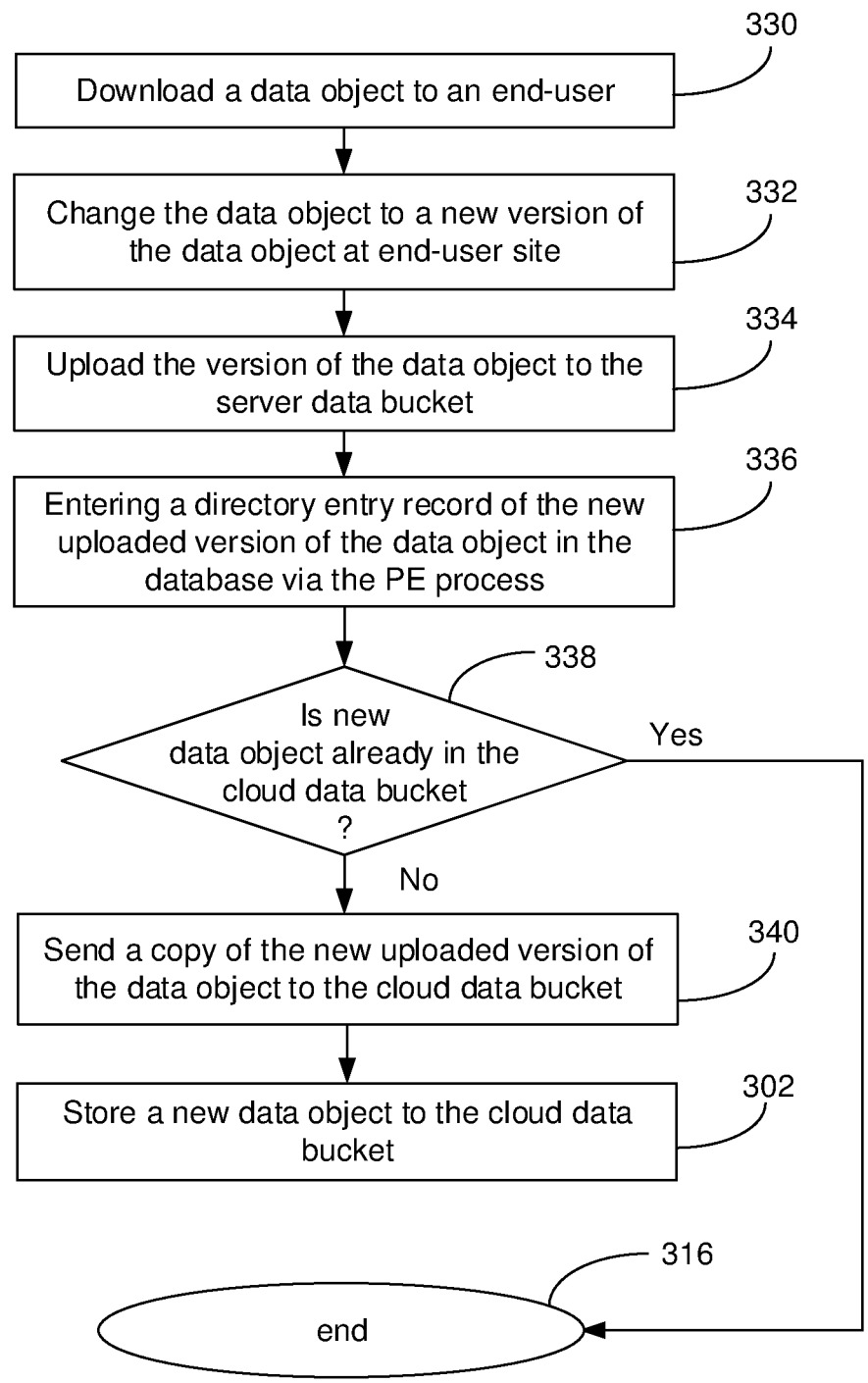

FIG. 2H shows an end user 105 locating the latest version of Data Object 2 in the server data bucket 132 and downloading DO2S_Latest to their local computer along communications pathway 112, step 330 of FIG. 3B. In this embodiment, the end user 105 may or may not know the explicit location of DO2S_Latest. Rather, the end user 105 may simply see a directory entry of the latest version of Data Object 2 behind a web address link, such as an HTTPS website link, that points to the directory 158 in the cloud 102. As discussed earlier, an end-user 105 can much more readily download the latest version of Data Object 2 because it is a smaller file (low resolution data file) than Data Object 1; therefore, DO2 is easier to manipulate (work on) due to the amount of computing power required to manipulate the smaller data object. In the event the data content associated (i.e., uniquely linked) with data object DO2S_Latest is still in the cloud data bucket 130, but not in the server data bucket 132, the data content associated with data object DO2S_Latest is simply moved into the private server 101 and to the end user 105. Accordingly, one advantageous embodiment is always to retain a copy of the data content associated with data object DO2S_Latest in the server data bucket 132.

As shown in FIG. 2I, after the end user 105 has edited or otherwise changed the latest version of Data Object 2 into a new version of Data Object 2, step 332, the end user 105 sends the new version of Data Object 2 up to the private server 101, and more specifically, to the server data bucket 132 along communications pathway 112, step 334. In certain embodiments, the end user 105 is aware of only a single data bucket to which the new version of Data Object 2 is uploaded. Because the new version of Data Object 2 is uploaded to the server data bucket 132, the former 'latest' version of Data Object 2 is shown as Data Object 2 Latest-1, or DO2S_Latest-1, to designate that the former version of Data Object 2 is no longer the latest version.

Figure 2J:
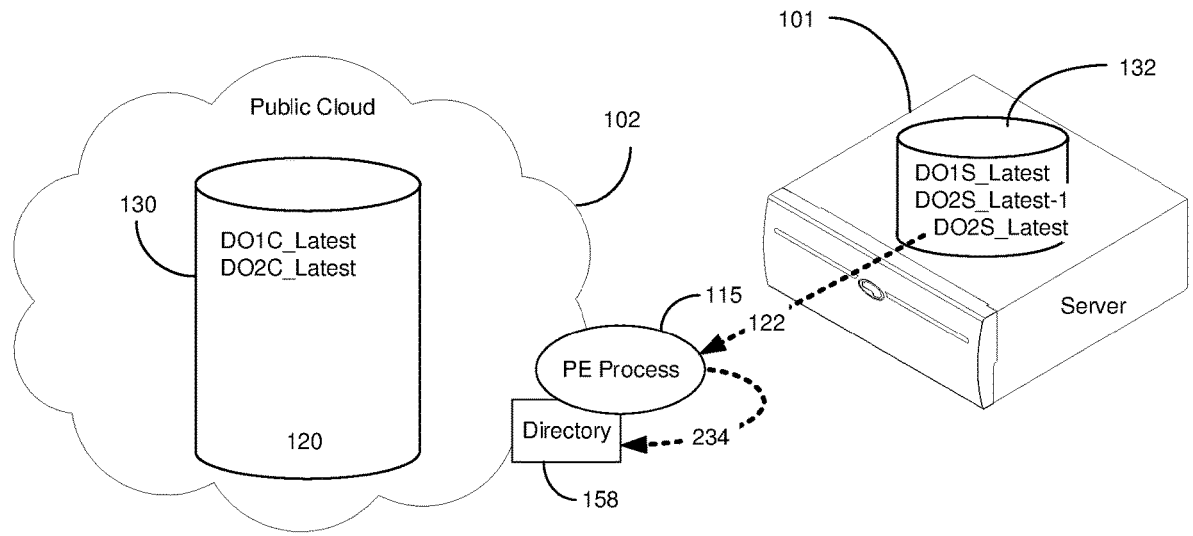

As soon as the latest version of Data Object 2 is in the server data bucket 132 (DO2S_Latest), which bumps the former DO2S_Latest to DO2S_Latest-1 (now an older version of DO2S), metadata corresponding to DO2S_Latest is entered into the directory 158 via the PE process 115 through pathways 122 and 234, shown in FIG. 2J, step 336.

Figure 2K:
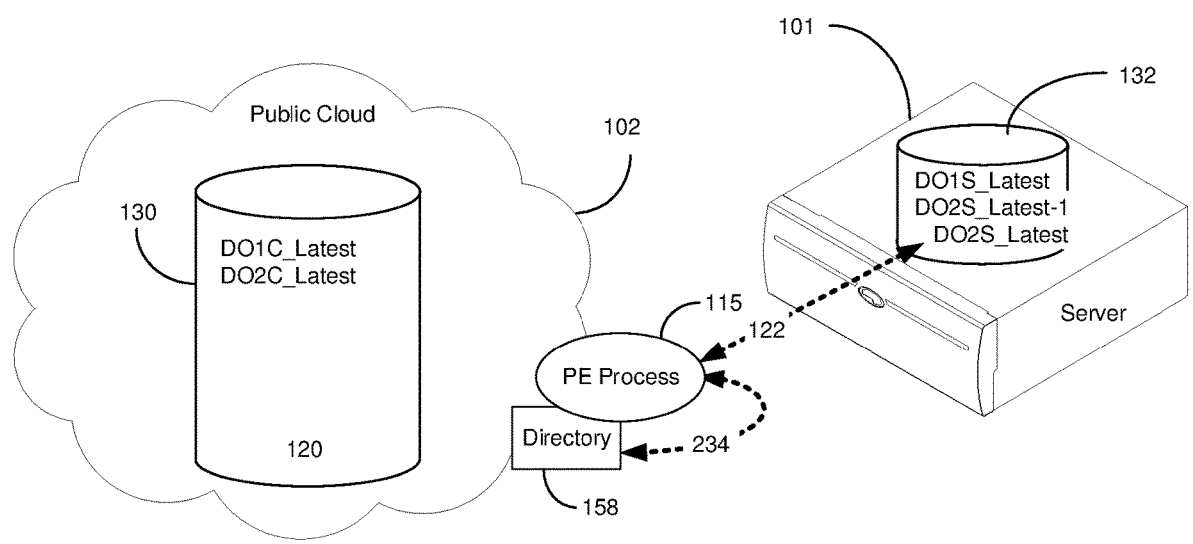

FIG. 2K illustratively depict an embodiment wherein the private server 101 determines that there is no data object corresponding to DO2S_Latest in the cloud data bucket 130 via the directory 158, the "No" arrow in step 338. Hence, commence syncing DO2S_Latest to the cloud data bucket 130, step 340. If "Yes" proceed to step 316, "end".

Figure 2L:
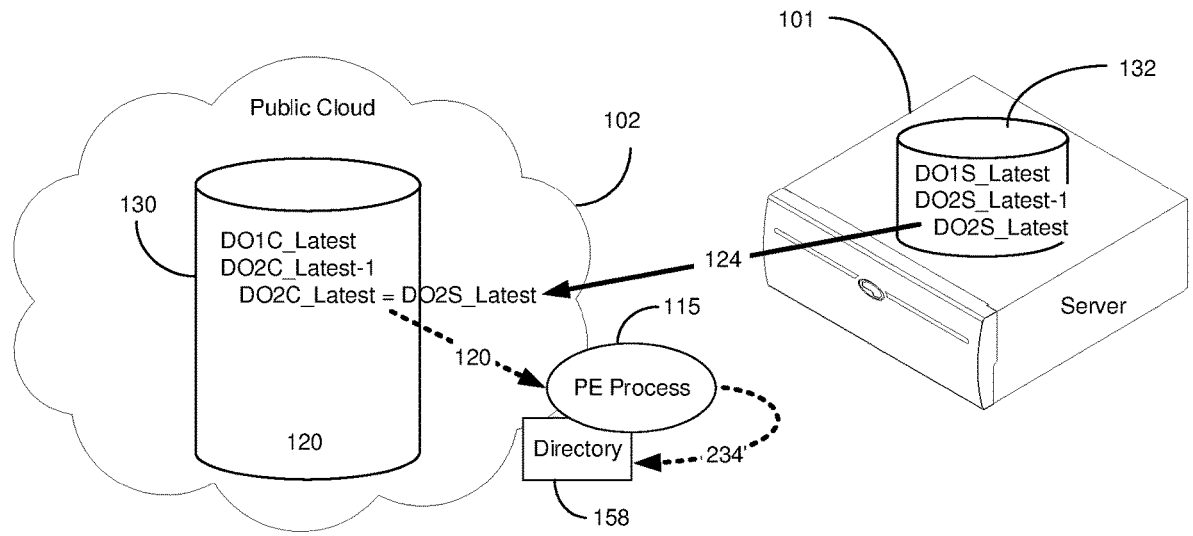

In step 340, as shown in FIG. 2L, a copy of the newest version of Data Object 2 is sent or otherwise "pushed" to the cloud bucket 130 over server to cloud communications pathway 124, which in certain embodiments is not controlled by the PE process 115, step 340. The newly added DO2C_Latest is equivalent to DO2S_Latest, which is the latest data object in the server data bucket 132. Accordingly, the former DO2C_Latest now becomes DO2C_Latest-1 in the cloud data bucket 130, as shown. Once the cloud data bucket 130 is completely in possession of DO2C_Latest, the metadata directory entry is made to the directory 158 via the PE process 115 along pathways 120 and 124, step 304. A skilled artisan will appreciate that directory entries include metadata about the data objects and location information corresponding to each data object.

Figure 2M:
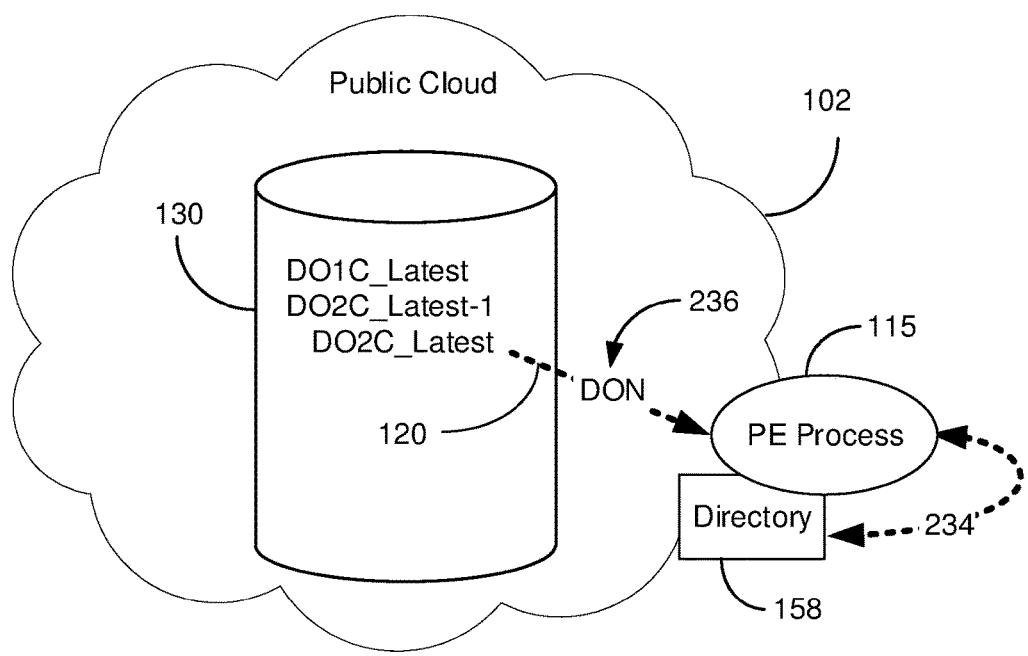

In certain embodiments, whenever the cloud data bucket 130 receives a new data object, which in this case is DO2C_Latest, the data bucket synchronization process commences. FIG. 2M illustratively depicts a DON 236 going to the PE process 115 to replicate DO2C_Latest to the server data bucket 132 because DO2C_Latest was just added to the cloud data bucket 130, step 306. In this embodiment, the cloud data bucket 132 does not know that DO2C_Latest came from the server data bucket 132 and therefore the cloud data bucket 132 is simply carrying out policy instructions to replicate new data objects stored therein. Before the PE process 115 passes the DON onto the private server 101, the PE process 115 consults the directory database 158 and determines that the server data bucket 132 is already in possession of the latest version of Data Object 2 (DO2_Latest), step 308. At this point, the migration portion of the synchronization process stops, "Yes" arrow and proceed to step 316. It should be appreciated that the steps in the aforementioned block diagrams of FIGS. 3A and 3B are not necessarily required to follow the order in which the steps are presented.

Figure 4A:
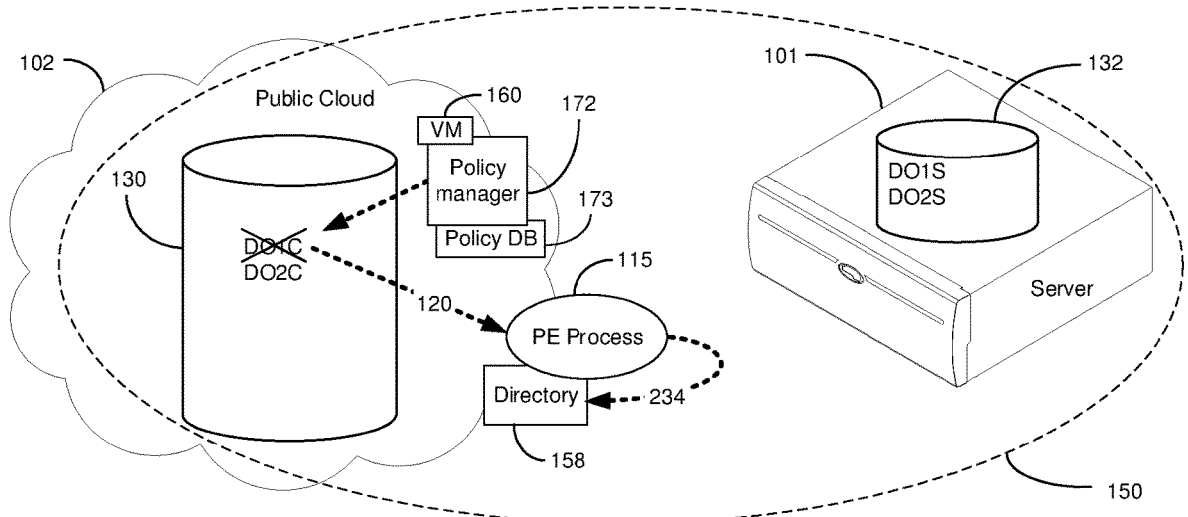
FIGS. 4A and 4B are line drawings that illustratively depict certain deletion methods consistent with embodiments of the present invention.
Figure 4B:
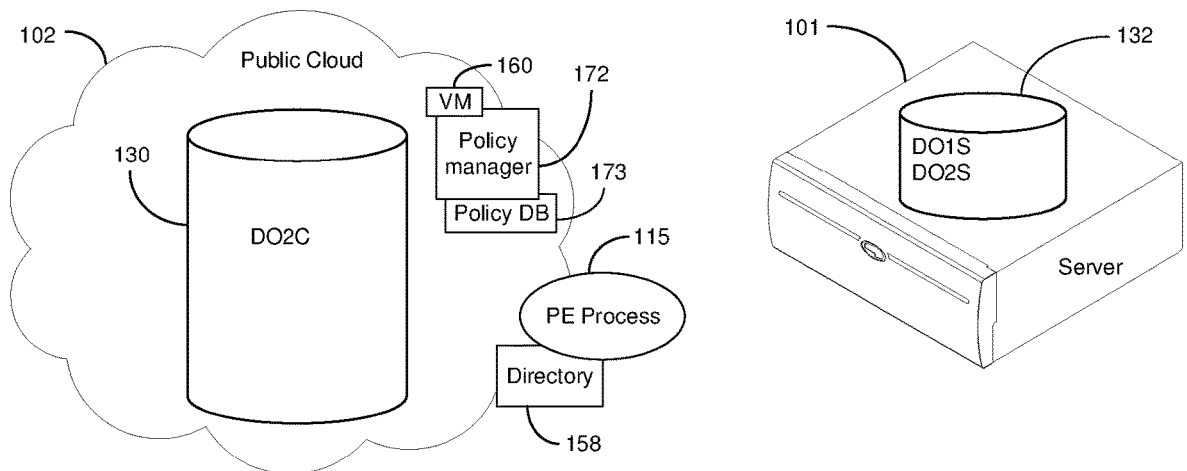

FIGS. 4A and 4B are line drawings that illustratively depict certain deletion methods consistent with embodiments of the present invention. FIGS. 4A and 4B are described in conjunction with the method steps shown in the block diagram of FIG. 5. As shown in FIG. 4A, the virtual machine (VM) 160, which is attached to the PE 150, is in cooperation with a policy manager 172 also incorporated in the PE 150. Certain other embodiments contemplate the policy manager 172 being part of the PE process 115 wherein the PE process 115 is the 'traffic cop' for everything that occurs in the PE 150. The policy manager 172 comprises a plurality of policy rules that among other things manage data objects located in each data bucket within the PE 150. Policies can be entered in by an end-user 105 when setting up the data buckets 130 and 132. In certain embodiments, policies can be changed or added any time.

The present embodiment starts where FIG. 2G leaves off with a) DO1C and DO2C in the cloud data bucket 130 and b) DO1S and DO2S in the server data bucket 132. With respect to the embodiment where Data Object 1 comprises a massive amount of raw data, such as high definition video data, it is advantageous to delete Data Object 1 only from the cloud data bucket 130 because maintaining and downloading a massive amount of data in the cloud 102 is expensive. Meanwhile, keeping a copy of Data Object 1 in the private server data bucket 132 means that a record of the raw high definition video data are held (stored) with no maintenance fee and access is relatively fast if done locally. In such cases, it is further imagined that Data Object 1 can be moved to cold storage, such as tape cartridges, where the data can be held in perpetuity. Though certain embodiments envision Data Object 1 deleted from only the cloud data bucket 130 based on policy rules, other embodiments envision an end-user actively deleting Data Object 1 from the cloud data bucket 130.

Considering the scenario where policy rules dictate the deletion of Data Object 1 from the cloud data bucket 130, step 502 contemplates another policy rule that automatically reduces the size of DO1C by rendering DO1C into a lower resolution version via a data editor 156 program running in the cloud 102. Reducing the size of DO1C needs to be completed before deleting DO1C from the cloud bucket 130. Of course, if there is no need to render, or otherwise change, Data Object 1, then the method steps need go no further, step 514. The lower resolution version of Data Object 1 is a new data object (Data Object 2 Cloud, or simply DO2C) stored in the cloud data bucket 130, step 504. As shown in step 506, because the lower resolution version of the Data Object 1 is a new data object, replication processes are invoked in the cloud 102. Invocation of the replication processes can be made to happen automatically based on policy rules maintained in a policy data-base (DB) 173 and managed by the policy manager 172 all being run in the computer environment of the virtual machine (VM) 160. Accordingly, the steps involved in replicating the new DO2C commence with step 302 of FIG. 3A discussed in detail above. The replication process of the new rendered data object (DO2C) commences either before, during or after the rendering process. Following the replication procedure of FIG. 3A (with Data Object 1 safely in the server data bucket 132 and Data Object 2 created in the cloud data bucket 130), assuming there is a deletion policy rule in the to manage data quantity use in the cloud 102, Data Object 1 is deleted from only the cloud data bucket 132, step 508. Of course, if there is no deletion policy rule in effect, then the process ends, step 514. One embodiment imagines tagging Data Object 1 as only existing in one or more specified server data buckets 132. That is, if there are three private servers in different locations, for example, Data Object 1 can be tagged to exist in only one or two of the private servers, or optionally in all three. This can be accomplished by sending a message or tag to the directory 158 (such as over pathways 120 and 234) indicating that Data Object 1 is not to exist in the server data bucket 130, but rather in the one or more specified server data buckets 132, step 510. After the entry in the directory 158, Data Object 1 is deleted step 512. Hence, if all of the data buckets in the PE 150 are synced, Data Object 1, which is deleted from the cloud data bucket 130, will not re-sync to the cloud data bucket 130. Certain embodiments envision a network of private servers in the PE 150, each with their own private data bucket that syncs in the PE 150 based on policy rules. It should be appreciated that the steps in the aforementioned block diagram are not necessarily required to follow the order in which the steps are presented.

In an optional embodiment, the DO1C has an attached, lifecycle policy (i.e. a time-based-policy that can be maintained in the policy DB 173 and carried out by the policy manager 172) that forces the deletion of DO1C from the cloud bucket 130 after predetermined amount of time, such as a defined number of days. Embodiments where the cloud bucket 130 is in an Amazon cloud web service (AWS), AWS policies generally specified days and not hours or minutes. Hence, if a customer/end-user 105 wants a low resolution data object of DO1C, then the customer 105 would use the AWS data editor tool 156 in the VM 160 to make that happen before the lifecycle deletion occurs with DO1C. Of course, the data editor tool 156 can be automated to convert DO1C to DO2C as part of the lifecycle policy for excessively large data objects as defined by an end-user.

FIG. 4B is a line drawing block diagram that illustratively depicts the end result of the Data Object 1 deleted from the cloud data bucket 130 but retained in the server data bucket 132.

Figure 6A:
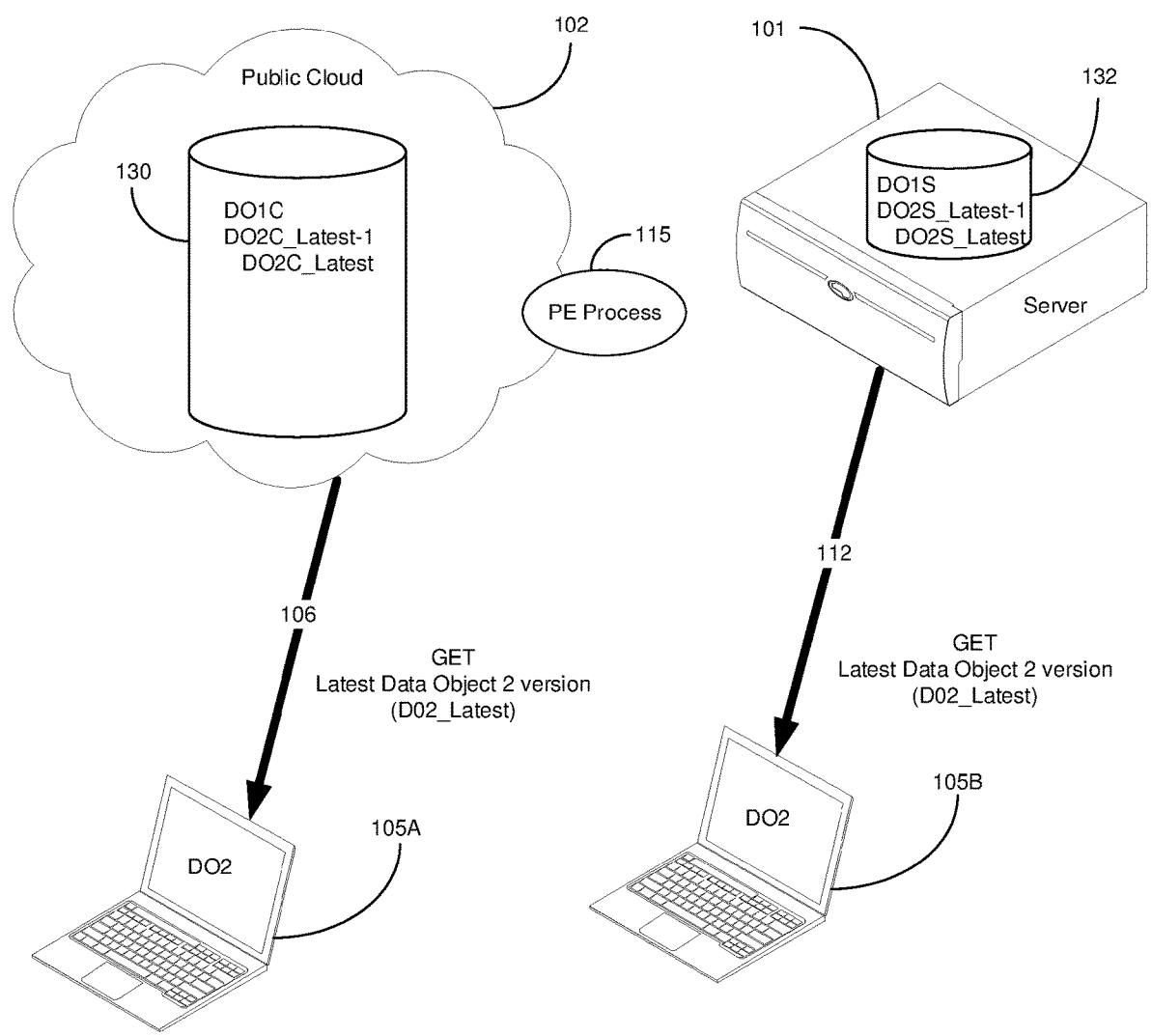
FIGS. 6A-6G are block diagram layouts that illustratively depict a data object conflict resolution processes consistent with embodiments of the present invention.

FIGS. 6A-6G are block diagrams that illustratively depict a data object conflict resolution processes consistent with embodiments of the present invention. FIGS. 6A-6G are shown in view of the method steps in the block diagram of FIG. 7. The cloud data bucket 130 and server data bucket 132 contain the data objects as left off from FIG. 2L, step 702. Specifically DO1, DO2_Latest-1 and DO2_Latest are equally contained in both the cloud data bucket 130 and the server data bucket 132, as shown in FIG. 6A. Specifically, the nomenclature in the cloud data bucket 130 is DO1C, DO2C_Latest-1 and DO2C_Latest with the "C" standing for "cloud" and the nomenclature in the server data bucket 132 is DO1S, DO2S_Latest-1 and DO2S_Latest with the "S" standing for "server". In the present arrangement, a first end-user 105A is downloading DO2_Latest from the cloud data bucket 130 via communications pathway 106 and a second end-user 105B is downloading DO2_Latest from the server data bucket 132 via communications pathway 112 (DO2C_Latest and DO2S_Latest are the same data object but just in different locations), step 704. The first end-user 105A may be in a distant location from the second end-user 105B, such as on a different continent for that matter.

Figure 6B:
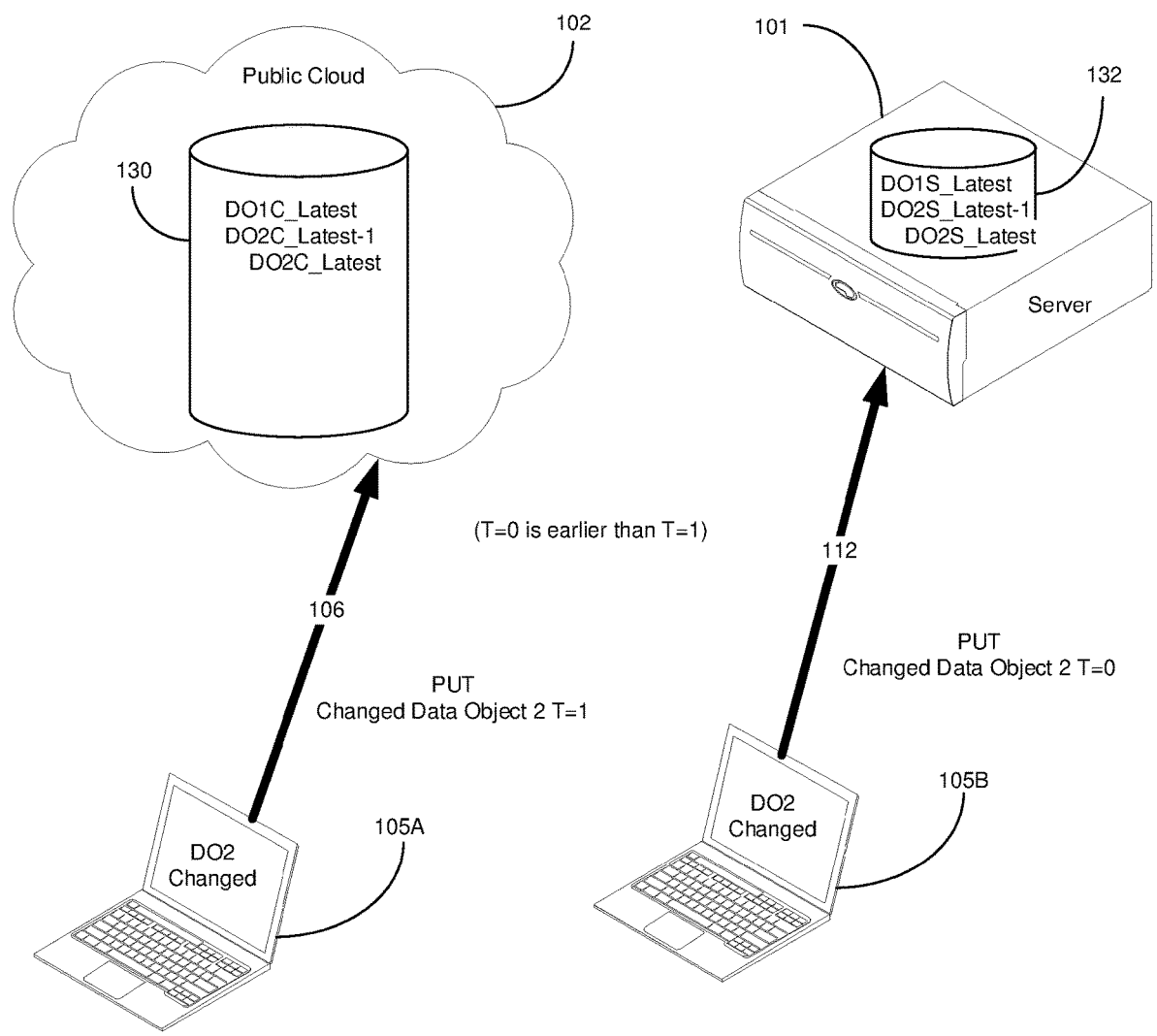
Figure 7:
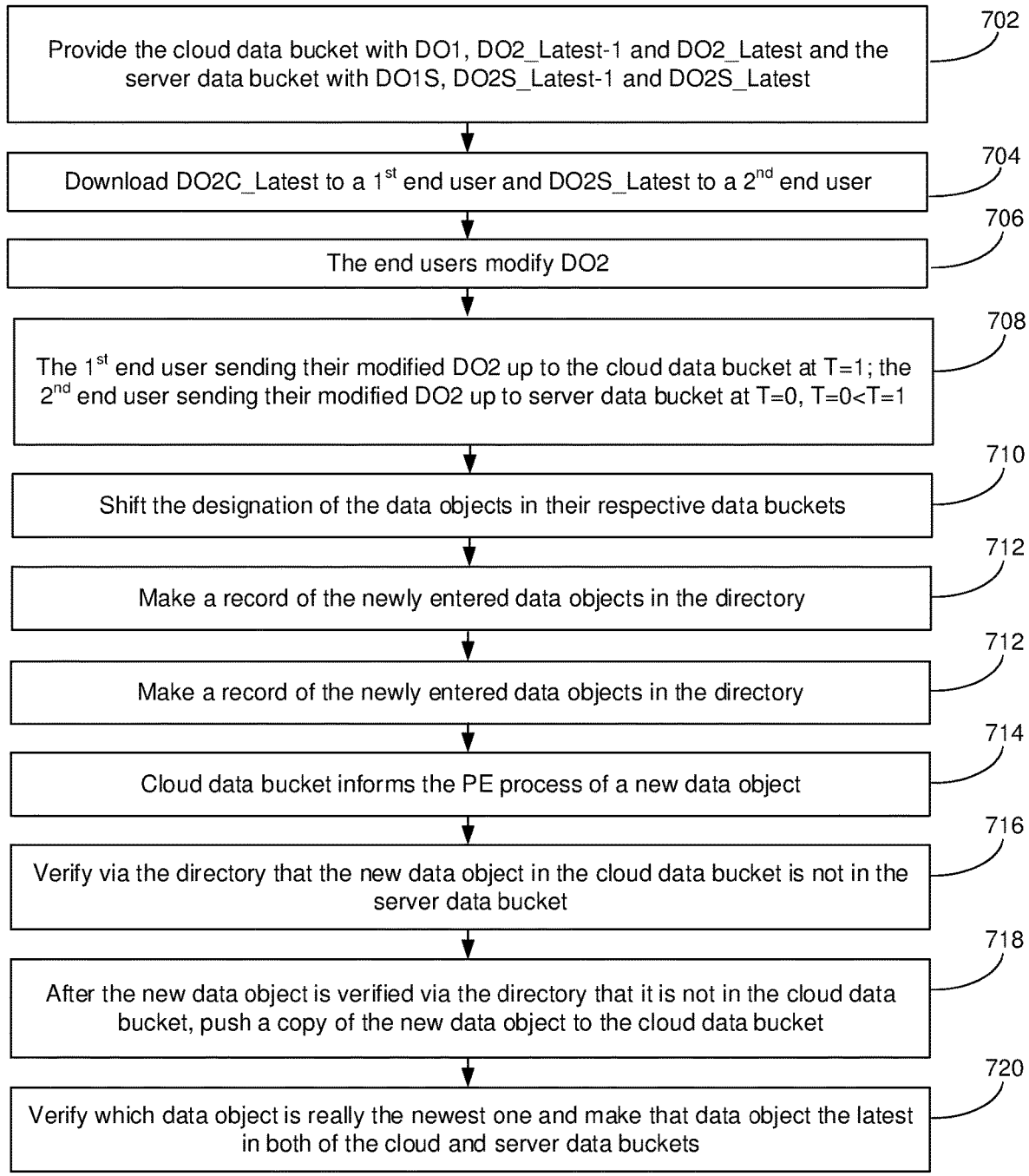
FIG. 7 is a block diagram flow chart of a method for deletion embodiments of FIGS. 6A-6G consistent with embodiments of the present invention.

As shown in FIG. 6B, the first end-user 105A and the second end-user 105B each modified the former latest version of Data Object 2 into respective new versions of Data Object 2, step 706. The new versions of Data Object 2 are uploaded back to their respective data buckets 130 and 132 at almost the same time. Data Object 2 newest version produced by the first end-user 105A is designated "Data Object 2_Latest A" to distinguish from the new data object produced by the second end-user 105B, which is designated "Data Object 2_Latest B". In this embodiment, DO2_Latest B is transmitted up to the server data bucket 132 at T=0, which is slightly before/earlier then when DO2_Latest A is transmitted up to the cloud data bucket 130 at T=1, step 506. In other words, T=0 is earlier than T=1, which may only be the difference of a millisecond for example. When a Data Objects is transmitted up to a data bucket, metadata including a timestamp is included therewith. Accordingly, when DO2_Latest B is transmitted up to the server data bucket 132 at T=0 there is a timestamp (a record of the transmission time) accompanying DO2_Latest B. Likewise, when DO2_Latest A is transmitted up to the cloud data bucket 130 at T=1, there is a timestamp accompanying DO2_Latest A, step 708. Based on the timestamp, DO2_Latest B is sent up before DO2_Latest A.

Figure 6C:
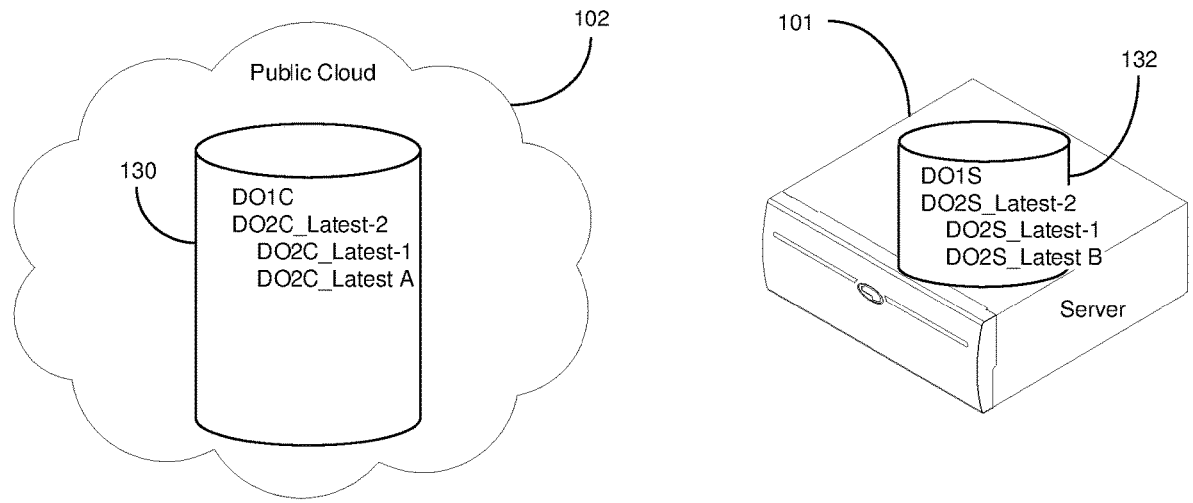

FIG. 6C shows the data objects in their respective data buckets prior to syncing the data buckets. Hence, the server 101 shifts the data object version designation so that the server data bucket 132 now contains DO1S, DO2S_latest-2, DO2S_Latest-1 and DO2S_Latest B. Likewise, the public cloud 102 shifts the data object version designation so that the cloud data bucket 130 now contains DO1C, DO1C_Latest-2, DO2C_Latest-1 and DO2C_Latest A, step 710. It should be appreciated that at this point in time, the server data bucket 132 considers DO2S_Latest B as simply Data Object 2 latest version and the cloud data bucket 130 considers DO2C_Latest A as simply Data Object 2 latest version. Because both data buckets 130 and 132 consider the newly arrived data object to be Data Object 2 newest/latest version, there is an inherent conflict as to which data object should truly be designated Data Object 2 latest version, discussed below. In certain embodiments, the latest (most recent) version is typically the version that is downloaded and processed by and end user 105, for example.

Figure 6D:
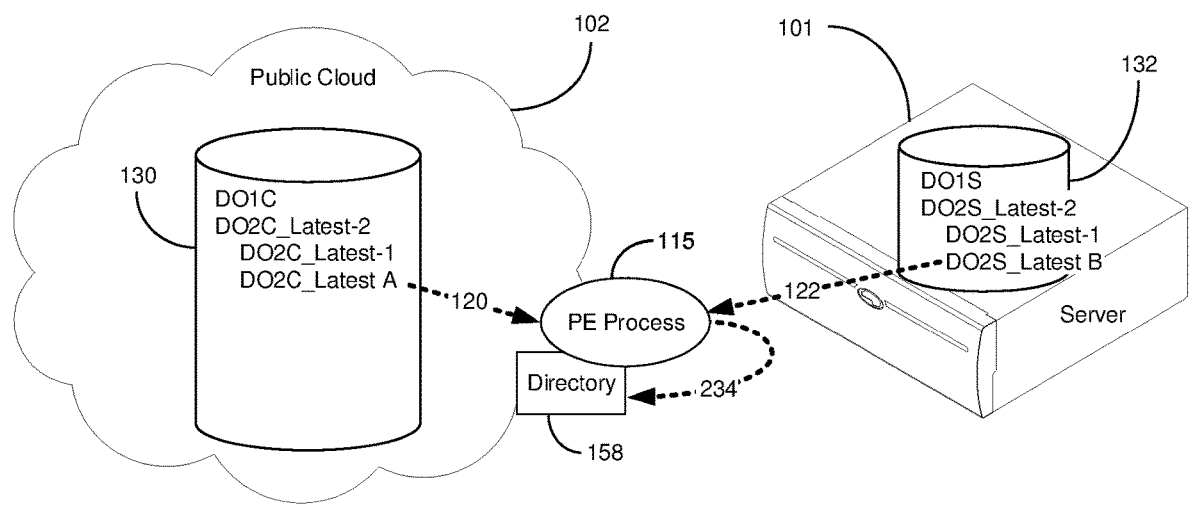

FIG. 6D illustratively depicts making a record of each newly loaded data object, DO2C_Latest (A) and DO2S_Latest (B) in the data object directory 158 as shown by the dotted lines 120, 122 and 234, step 712. The specific step of which are described in conjunction with FIGS. 2C and 2E. As should be appreciated, DO2S_Latest B is tagged with identification key and timestamp that is different from DO2C_Latest A.

Figure 6E:
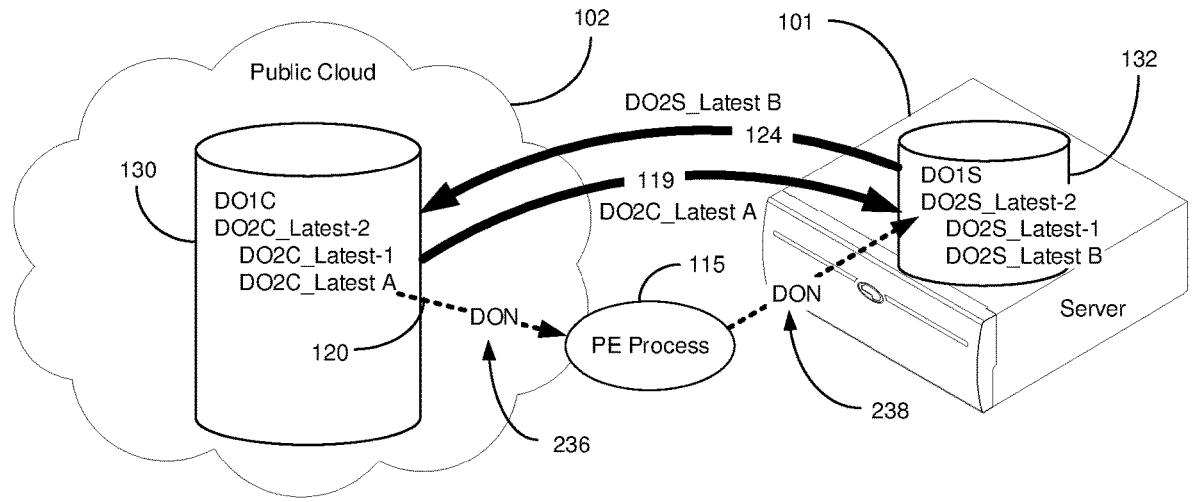
Figure 6F:
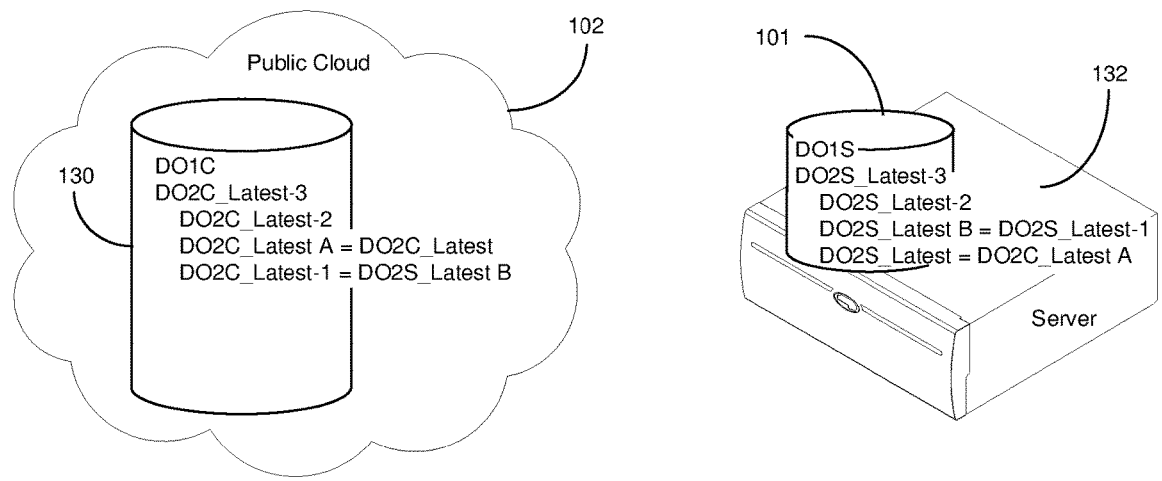

FIG. 6E illustratively depicts syncing the cloud data bucket 130 with the server data bucket 132 following conflict resolution rules, which in certain instances are managed by the policy manager 172 and maintained in the policy DB 173, but just as easily could be managed via the PE process 115 and/or maintained elsewhere. One conflict resolution rule dictates that the newest data object based on the time stamp will simply govern as the "Latest" data object. With regards to syncing DO2C_Latest A in the cloud bucket 130 with the server bucket 132, first a data object notification "DON" 236 informs the PE process 115 that a new data object, DO2C_Latest A, is in the cloud data bucket 130, step 714. The fact that the PE process 115 is not constantly scanning the cloud data bucket 130 for any new data objects but rather immediately receives notification of a new data object is asynchronous data object notification for syncing operations. Hence, the PE process 115 waits for asynchronous notification of a data object from the cloud data bucket 130 instead of querying the cloud data bucket 130 at discrete intervals of time. Given that the PE process 115 verifies that DO2C_Latest A is not in the server data bucket 132, step 716, the PE process 115 then pulls DO2C_Latest A from the cloud data bucket 130 and pushes DO2C_Latest A to the server data bucket 132, step 716. Meanwhile, DO2S_Latest B, which is the new data object in the server data bucket 132, is transferred to the cloud data bucket 130 over server to cloud pathway 124. This occurs after it is verified that it DO2S_Latest B is not in the cloud data bucket 130 thanks to information provided by the PE process 115 and the directory 158, step 718. In certain embodiments, the PE process 115 does not facilitate migration of DO2S_Latest B to the cloud data bucket 130 via the server to cloud pathway 124. DO2C_Latest A and DO2S_Latest B are in conflict with one another because both data objects were essentially loaded in different data buckets at almost the same time. FIG. 6F illustratively depicts handling the conflict resolution between DO2C_Latest A and DO2S_Latest B.

As shown in FIG. 6F, because data object DO2S_Latest B has an earlier timestamp than DO2C_Latest A, albeit ever so small, DO2S_Latest A is actually the latest version based on the latest timestamp rule. During the syncing process of FIG. 6D, DO2C_Latest A is converted to simply DO2_Latest and DO2S_Latest B is converted to DO2_Latest-1, step 720. In this way, anyone seeking to download the latest version of Data Object 2 will access Data DO2_Latest. For reference, FIG. 6F shows DO1C, DO2C_Latest-3, DO2C_Latest-2, DO2C_Latest-1 and DO2C_Latest in the cloud bucket 130 and DO1S, DO2S_Latest-3, DO2S_Latest-2, DO2S_Latest-1 and DO2S_Latest in the server data bucket 132. In other words, in the present embodiment, there is a record of all the different data objects (and their associated object versions) retained by the cloud data bucket 130 and the server data bucket 132. Certain embodiments envision converting a data object from a version_Latest-1 to a version_Latest due to the conflict occurring before, during or after the syncing process using the time stamps as the authority (authoritative guide).

Figure 6G:
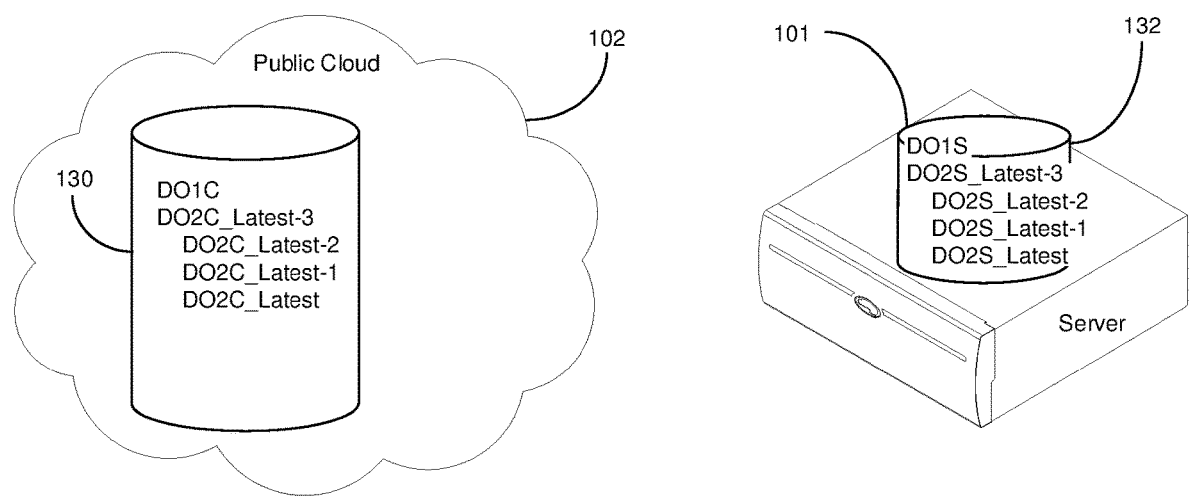

FIG. 6G is a block diagram showing the end result of 'Data Object 1' version 1, and 'Data Object 2' versions 1-4 (oldest to newest) retained in both of the cloud data bucket 130 and the server data bucket 132.

With the present description in mind, below are some examples of certain embodiments illustratively complementing some of the methods and apparatus embodiments discussed above and presented in the figures to aid the reader. The elements called out below are provided by example to assist in the understanding of the present invention and should not be considered limiting. The reader will appreciate that the below elements and configurations can be interchangeable within the scope and spirit of the present invention.

In that light, certain embodiments contemplate a content synchronization method that can be practiced in a private environment (PE) 150 that comprises public cloud resources 103 in a public cloud 102, a PE process 115, and at least one private server 101, the public cloud resources 103 including cloud non-transitory mass storage memory 152 (such as a bank of HDDs, SSDs, tape cartridges), cloud computer processors 154, data services 156, and at least one virtual machine (VM) 160 that runs the PE process 115. A Spectra Logic Vail environment is one commercial example of a private environment 150, produced by Spectra Logic Corporation of Boulder, Colo. Certain steps include setting up or otherwise creating a cloud data bucket 130 in the public cloud 102 and a server data bucket 132 in the private server 101, as shown in at least FIGS. 2A-2M in view of FIGS. 3A and 3B. Once the data buckets 130 and 132 are set up, data object (DO1) is stored in the cloud data bucket 130 invoking the public cloud 102 to asynchronously notify the PE process 115 that the data object (DO1) is in the cloud data bucket 130. After the notifying step, only if the PE process 115 determines that the data object (DO1) is not in the server data bucket 132 then the PE process 115 informs the at least one private server 101 that the data object (DO1) is in the cloud data bucket 130. If the informing step occurs then the private server 101 pulls a copy of the data object (DO1) from the cloud data bucket and storing the data object (DO1) in the server data bucket 132.

The content synchronization method further imagining wherein the PE process 115 determines the presence of the data object (DO1) in the server data bucket 132 by consulting a directory 158 that is retained in the public cloud 102, the directory 158 containing a record of the data object (DO1).

Optionally, the content synchronization method further contemplating wherein the record is not maintained in the private server 101.

Optionally, the content synchronization method further considering wherein the storing, the notifying, the informing and the pulling steps are accomplished without human intervention.

Optionally, the content synchronization method further comprising after the pulling step, making a new record that the data object (DO1) is located in the server data bucket 132, the new record is not retained in the private server 101.

Optionally, the content synchronization method further comprising at the public cloud altering the data object (DO1) into a new altered data object (DO2) and repeating the notifying, the informing and the pulling steps with the new altered data object (DO2). This can further be wherein the altering step is initiated automatically by a policy rule maintained in the public cloud 102 for the cloud data bucket 130. Or, this can further comprise after the altering step, automatically deleting the data object (DO1) based on an instruction from a policy rule maintained in the public cloud 102 for the cloud data bucket 130.

Optionally, the content synchronization method further comprising: loading a new data object (DO3) in the server data bucket 132; without any notifications of the new data object to the PE process 115, automatically sending a copy of the new data object (DO3) from the server data bucket 132 to the cloud data bucket 130 and retaining the copy of the new data object (DO3) in the server data bucket 132; and after the retaining step copy of the new data object (DO3) repeat the notifying step with the copy of the new data object (DO3). This method can further comprise sending a record of the new data object (DO3) to a directory 158 that is retained in the public cloud 102, the record is not maintained in the private server 101.

Optionally, the content synchronization method further pondering wherein the copy of the data object (DO1) is uniquely linked to data object content, the data object content is in the cloud data bucket 130 but not in the server data bucket 132.

Yet another embodiment of the present invention, which can be viewed against at least FIGS. 2A-2M in view of FIGS. 3A and 3B, contemplate a data bucket synchronization method comprising: providing a Private Environment (PE) 150 that includes a public cloud 102 and at least one private server 101, the private server 101 comprising a server data bucket 132, the public cloud 102 comprising a cloud data bucket 130, a virtual machine 160, and a Private Environment (PE) process 115 that is running on the virtual machine 160, and the PE 150 receiving a new data object. If the new data object is received by the public cloud 102 then issuing an asynchronous migration notification to the PE process 115 that the new data object is stored to the cloud data bucket 130 and only if the PE process 115 determines that the new data object is not in the server data bucket 132 then passing on the migration notification from the PE process 115 to the at least one private server 101 causing pulling a cloud copy of the new data object by the at least one private server 101 from the cloud data bucket 130 to the server data bucket 132. If the new data object is received by the at least one private server 101 and the at least one private server 101 establishes that the new data object is not in the cloud data bucket 130 then the at least one private server 101 sending a server copy of the new data object to the cloud data bucket 130 without any notifications from the PE process 115 to the public cloud 102.

Optionally, the data bucket synchronization method can further comprise an end user 105 entering the PE 150 to access the new data object in at least one of the data buckets 130 and 132.

Optionally, the data bucket synchronization method considers wherein the cloud data bucket 130 and the server data bucket 132 are virtualized storage space comprised of non-transient memory. This can further be wherein the virtualized storage space is allocated to the PE 150.

Another option of the data bucket synchronization method envisions wherein the PE process 115 determines that the new data object is not in the server data bucket 132 via directory information contained in a directory 158 and wherein the at least one private server 101 establishes that the new data object is not in the cloud data bucket 130 via the directory information contained in the directory 158. This can further include entering location records of where the new data object in the data buckets 130 and 132, the location records are maintained in the public cloud 102 and are not maintained in the private server 101.

Another option of the data bucket synchronization method envisions ponders wherein the new data object is a modified version of a data object that exists in the cloud data bucket 130 and the server data bucket 132.

Still other embodiments of the present invention contemplate a method for syncing multiple data buckets 130 and 132 in a syncing operation. These syncing operation embodiments can be viewed against at least FIGS. 2A-2M in view of FIGS. 3A and 3B. The method can fundamentally be practiced in a Private Environment (PE) 150 that includes a public cloud 102 possessing a cloud data bucket 130 and at least one private server 101 possessing a server data bucket 132. If a new data object is stored to the cloud data bucket 130 then commencing a cloud-to-server synchronization procedure that includes notifying the private server 101 of the new data object in the cloud data bucket 130 via a PE process 115 running in the public cloud 102 followed by the private server 101 pulling a cloud copy of the new data object from the cloud data bucket 130 into the server data bucket 132. If the new data object is stored to the server data bucket 132 then commencing a server-to-cloud synchronization procedure that includes sending server copy of the new data object from the server data bucket 132 to the cloud data bucket 130, the server-to-cloud synchronization procedure does not include the PE process 115 notifying the public cloud 102 of the new data object.

Optionally, the method for syncing multiple data buckets 130 and 132 in a syncing operation can further be wherein the notifying the private server 101 of the new data object in the cloud data bucket 130 is an asynchronous notification.

Figure 5:
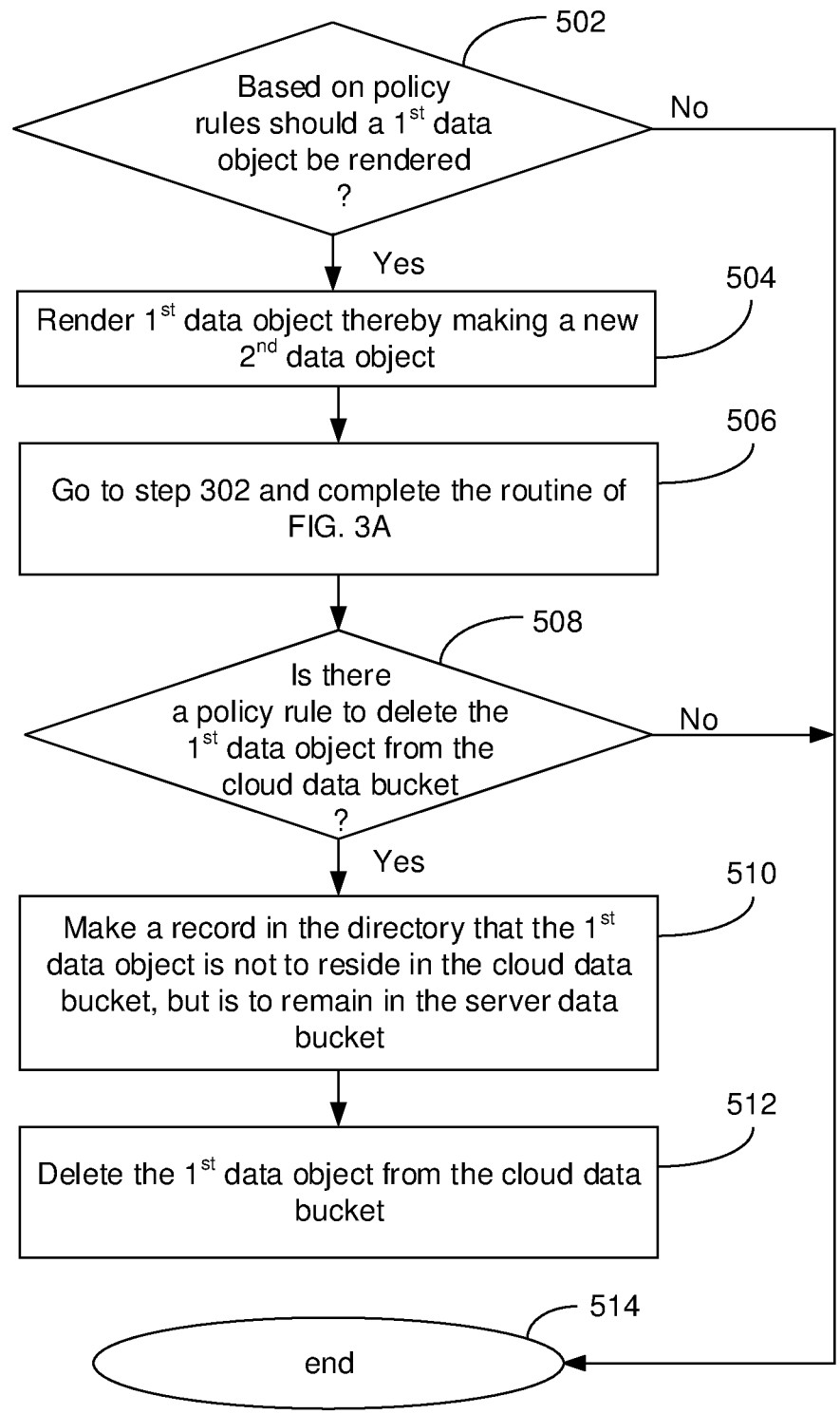
FIG. 5 is a block diagram flow chart of a method for deletion embodiments of FIGS. 4A and 4B consistent with embodiments of the present invention.

With reference to at least FIGS. 4A, 4B and 5, certain embodiments contemplate a partial content synchronization method can be practiced in a private environment (PE) 150 comprising a first data object (DO1), a cloud data bucket 130, a server data bucket 132, a PE process 115 and a policy database 173, the cloud data bucket 130 maintained by a public cloud 102 and the server data bucket 132 maintained by a private server 101, the first data object retained in the cloud data bucket 130 as DO1C and independently in the server data bucket 132 as DO1S. The method can further selectively delete the first data object from only the cloud data bucket 130. A record can be made to reflect that the first data object is not to exist in the cloud data bucket 130 but is to exist in the server data bucket 132. This can be followed by executing a syncing operation of all data objects between all of the data buckets 130 and 132 in the PE 150 wherein during the syncing operation, referring to the record. After completing the syncing operation, the first data object is retained in the PE 150 but not in the cloud data bucket 130.

Optionally, the partial content synchronization method embodiment can further include wherein the policy database 173 comprises a rule to delete the first data object from only the cloud data bucket 130 after a predetermined amount of time. This can further comprise after consulting the policy database 173, a policy manager 172 automatically initiating the deleting step after the predetermined amount of time.

Optionally, the partial content synchronization method embodiment is imagined wherein the record is sent to the PE process 115 that transmits the record to a directory 158 where the record is stored, the PE process 115 in the directory 158 are retained in the public cloud 102, the record is not retained in the private server 101.

Optionally, the partial content synchronization method embodiment further comprises an external entity 105 entering the PE 150 to obtain a copy of the first data object, obtaining the copy of the first data object from the PE 150 via the server data bucket 132. This can further be wherein the external entity 105 is unaware that the obtaining the copy of the first data object is via the server data bucket 132. And still, further be wherein the external entity 105 believes that the obtaining step is accomplished via the cloud data bucket 130.

Optionally, the partial content synchronization method embodiment can further comprise controlling a policy manager 172 that initiates the deleting step based on obtaining a deletion instruction from the policy database 173, the policy manager 172 is controlled by a virtual machine (VM) running in the PE 150 and provided by the public cloud 102.

Optionally, the partial content synchronization method embodiment can further comprise a second private server in the PE 150 that also contains a copy of the first data object in a second server data bucket.

Optionally, the partial content synchronization method embodiment can further comprise adding a second private server in the PE 150, the second private server comprising a second server data bucket, and performing a new syncing operation of all content from the server data bucket 132 and the cloud data bucket 130 with the second server data bucket, after the new syncing operation, the first data object is in the server data bucket 132 and the second server data bucket but the first data object is not in the cloud data bucket 130.

Optionally, the partial content synchronization method embodiment can further comprise generating a second data object by altering the first data object in the public cloud 102, storing the second data object in the cloud data bucket 130, the public cloud 102 asynchronously notifying the PE process 115 that the second data object is in the cloud data bucket 130, after the notifying step, only if the PE process 115 determines that the second data object is not in the server data bucket 132 then informing the private server 101 that the second data object is in the cloud data bucket 130. If the informing step occurs then the private server 101 pulling a copy of the second data object from the cloud data bucket and storing the data object in the server data bucket 132, the generating, the storing, the notifying, the informing and the pulling steps occur before the deleting step and the creating a record step.

Optionally, the partial content synchronization method embodiment can further be wherein the creating step occurs before the deleting step.

Yet another method for partial content synchronization, which can be viewed with respect to at least FIGS. 4A, 4B and 5 can include a private environment (PE) 150 that comprises a first data object (DO1), a cloud data bucket 130, a server data bucket 132, a PE process 115 and a policy database 173, the cloud data bucket 130 solely in a public cloud 102 and the server data bucket 132 solely in a private server 101, and a first data object retained in the cloud data bucket 130. The public cloud 102 can asynchronously notify the PE process 115 that the first data object is in the cloud data bucket 130. After the notifying step, the PE process 115 can inform the private server 101 that the first data object is in the cloud data bucket 130. After the informing step, a copy of the first data object can be pulled from the cloud data bucket to the server data bucket 132. The first data object can be selectively deleted from only the cloud data bucket 130. Furthermore, a record that the first data object is not to exist in the cloud data bucket 130 but is to exist in the server data bucket 132 can be created. This can be executed in a syncing operation of all data objects in the cloud data bucket 130 and in at least the server data bucket 132, but based on the record not syncing the first data object from the server data bucket 132 to the cloud data bucket 130.

Optionally, the method embodiment for partial content synchronization can further be wherein the policy database 173 comprises a rule to delete the first data object from only the cloud data bucket 130 after a predetermined amount of time. This can further comprise after consulting the policy database 173, a policy manager 172 automatically initiating the deleting step after the predetermined amount of time.

Optionally, the method embodiment for partial content synchronization can further be wherein the policy database 173 comprises a rule to delete the first data object from only the cloud data bucket 130 after altering the first data object into a second data object and storing the second data object to the cloud data bucket 130. This can further be wherein the record is sent to the PE process 115 that transmits the record to a directory 158 where the record is stored, the PE process 115 in the directory 158 are retained in the public cloud 102, the record is not retained in the private server 101.

Optionally, the method embodiment for partial content synchronization can further comprise an external entity 105 entering the PE 150 to obtain a copy of the first data object and identifying that the first data object is retained in the PE 150, it is irrelevant to the external entity 105 that the first data object is not retained in the cloud data bucket 130.

Still, a partial content synchronization method embodiment across multiple data buckets is contemplated. The method can be viewed with respect to at least FIGS. 4A, 4B and 5 and can include a private environment (PE) 150 that comprises a private environment (PE) 150 with a first data object (DO1), a cloud data bucket 130, a server data bucket 132, a PE process 115, a policy manager 172 and a policy database 173. The cloud data bucket 130 can reside in a public cloud 102 and the server data bucket 132 can reside in a private server 101. The first data object can be retained in the cloud data bucket 130 and also independently in the server data bucket 132. A record that the first data object is not to exist in the cloud data bucket 130 but is to exist in the server data bucket 132 can be created. The first data object can be deleted from only the cloud data bucket 130 wherein unless instructed by a specific restoration command originating from either a policy rule or an entity that is external to the PE 150. The first data object cannot be restored to the cloud data bucket 130 even though the first data object exists in at least the server data bucket 132 in the PE environment.

Optionally, the partial content synchronization method embodiment across multiple data buckets can further comprise adding a second server data bucket from a second private server in the PE 150 and syncing all objects between the cloud data bucket 130, the server data bucket 132 and the second server data bucket except that the first data object is not restored to the cloud data bucket 130.

Other embodiments of the present invention can include a conflict avoidance method for synchronizing data buckets, which can be viewed with respect to at least FIGS. 3A, 3B, 6A-6G and 7. The method can include a private environment (PE) 150 with a public cloud 102 and at least one private server 101, the public cloud 102 comprising a PE process 115 and a cloud data bucket 130 that includes a first data object (DO1C), the private server 101 comprising a server data bucket 132 that includes the first data object (DO1S). A first end-user 105A can download the first data object from the cloud data bucket 130 and then alter the first data object to a second data object-A. While this is happening, a second end-user 105B can download the first data object from the server data bucket 132 and then alter the first data object to a second data object-B. The second data object-A is different from the second data object-B. The first end-user 105A can then upload the second data object-A to the cloud data bucket 130 (in a 'put' operation). The second end-user 105B can upload (in a 'putting' operation) the second data object-B to the server data bucket 132 before the private server 101 has knowledge of the second data object-A in the cloud data bucket 130 and before the public cloud 102 has knowledge of the second data object-B in the server data bucket 132. The cloud data bucket 130 and the server data bucket 132 can be synced by transferring a copy of the second data object-A from the cloud data bucket 130 to the server data bucket 132 while (overlapping in time) transferring a copy of the second data object-B from the server data bucket 132 to the cloud data bucket 130. It can be established that the second data object-B was uploaded to the server data bucket 132 after the second data object-A was uploaded to the cloud data bucket 130, (data object-A was uploaded before data object-B). Accordingly, the second data object-B can be re-designated as a third data object in both the cloud data bucket 130 and the server data bucket 132, the third data object is the latest data object, the first data object, the second data object and the third data object are from the same family of data objects. (i.e., they are different versions).

In this embodiment, for all intents and purposes the first data object in the cloud is the same as the first data object in the server. In this way, an end user 105 who wants to access the first data object when entering the PE 150 can access the first data object from either the cloud data bucket 130 or the server data bucket 132. From the end user's point of view, they are accessing a the first data object from the PE 150. Hence, the end user 105 does not consider the DO1C being any different than DO1S because the data content is identical. Certain embodiments further envision that the PE 150 or optionally the server 102 decides which of the data buckets 130 or 132 the end user 105 will be directed when they try to access the first data object.

Optionally, the conflict avoidance method for synchronizing data buckets can further comprise prior to transferring the copy of the second data object-A from the cloud data bucket 132 the server data bucket 132, transmitting a new data object notification to a PE process 115 operated on a virtual machine 160 in the public cloud 102. This can further comprise after the transmitting step completing the transferring the copy of the second data object-A from the cloud data bucket 130 to the server data bucket 132 via a cloud to server pathway 120 and 122 that includes being managed by the PE process 115. This could also be wherein transferring the copy of the second data object-B from the server data bucket 132 to the cloud data bucket 130 does not involve the PE process 115.

Optionally, the conflict avoidance method for synchronizing data buckets can further be wherein the first data object is a first version of data object one, the second data object is a second version of the data object one, the third data object is a third version of the data object one.

Optionally, the conflict avoidance method for synchronizing data buckets can further comprise downloading the third data object when seeking the latest data object in either the server data bucket 132 or the cloud data bucket 130.

Optionally, the conflict avoidance method for synchronizing data buckets can further be wherein the cloud data bucket 130 has the same name as the server data bucket 132 and are considered the same data bucket by the first end-user 105A and the second end-user 105B.

Optionally, the conflict avoidance method for synchronizing data buckets can further be wherein after the redesignating step, the second data object-A includes content data that remains in the cloud data bucket 130 but is not transferred to the server data bucket 132 during the syncing step.

Optionally, the conflict avoidance method for synchronizing data buckets can further comprise a second private server comprising a second server data bucket that is linked to the server data bucket 132 and the cloud data bucket 130 and syncs data objects to the server data bucket 102 and the cloud data bucket 130. This can further be wherein the server data bucket 132 and the second server data bucket sync the data objects without a PE process 115.

In yet another embodiment, a method for synchronizing data buckets with a conflict is contemplated in view of at least FIGS. 3A, 3B, 6A-6G and 7. The method can include a private environment (PE) 150 that includes 1) a public cloud 102 comprising a cloud data bucket 130 and 2) at least one private server 101 comprising a server data bucket 132. This can further include a first end-user 105A changing a data object into an altered data object and uploading the altered data object to the cloud data bucket 130 at a first time. Meanwhile, a second end-user 105B is also changing the data object but into a different altered data object and uploading the different altered data object to the server data bucket 132 at a second time. After the uploading steps, syncing all of the data objects in the cloud data bucket 130 and the server data bucket 132. It can be established that the first time occurred before the second time. The altered data object can be designated as an earlier version of the data object than the different altered data object.

Optionally, the method for synchronizing data buckets with a conflict embodiment can further comprise one of the end-users 105A or 105B downloading the latest version of the data object which is the different altered data object.

Optionally, the method for synchronizing data buckets with a conflict embodiment can further comprise the first end-user 105A downloading the data object from the cloud data bucket 130 before the changing step and the second end-user 105B downloading the data object from the server data bucket 132 before the changing step.

Optionally, the method for synchronizing data buckets with a conflict embodiment can further comprise wherein during the syncing step, sending a notification from the cloud data bucket 130 a PE process 115 that the altered data object is newly loaded into the cloud data bucket 130, then the PE process 115 can pull a copy of the altered data object from the cloud data bucket 130 and pushing a copy of the altered data object to the server data bucket 132. This can further be wherein during the syncing step, a copy of the different altered data object is transferred from the server data bucket 132 to the cloud data bucket 130, the transferring step is devoid of involvement from the PE process 115, which can further be wherein the at least one of the sending step, the pulling step, and the pushing step occurs during the transferring step.

Optionally, the method for synchronizing data buckets with a conflict embodiment can further be wherein the establishing step occurs after the syncing step.

Optionally, the method for synchronizing data buckets with a conflict embodiment can further be wherein the syncing step occurs without human intervention.

Still yet another data bucket syncing method embodiment is contemplated in view of at least FIGS. 3A, 3B, 6A-6G and 7. The method can include a Private Environment (PE) 150 with 1) a public cloud 102 comprising a cloud data bucket 130 and 2) at least one private server 101 comprising a server data bucket 132. An altered data object is stored to the cloud data bucket 130 at a first time. Meanwhile, a different altered data object is stored to the server data bucket 132 at a second time, the altered data object and the different altered data object are versions of a common data object. After the storing steps, the altered data object from the cloud data bucket 130 is synced with the server data bucket 132 and syncing the different altered data object from the server data bucket 132 with the cloud data bucket 130. After establishing that the first time occurred before the second time, designating the altered data object as an earlier version of the common data object than the different altered data object.

Optionally, the data bucket syncing method embodiment can further be wherein during the storing the altered data object step, sending a notification from the cloud data bucket 130 a PE process 115 that the altered data object is newly loaded into the cloud data bucket 130, then the PE process 115 pulling a copy of the altered data object from the cloud data bucket 130 and pushing a copy of the altered data object to the server data bucket 132, coincidently during the storing the different altered data object, transferring a copy of the different altered data object from the server data bucket 132 to the cloud data bucket 130, the transferring step is devoid of involvement from the PE process 115.

The above embodiments are not intended to be limiting to the scope of the invention whatsoever because many more embodiments are easily conceived within the teachings and scope of the instant specification. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a web address is one of many way that can be used as a target for entering the private environment 150, some other pointer or address could equally be used while still maintaining substantially the same functionality without departing from the scope and spirit of the present invention. Another example can include embodiments that use the PE process 115 as essentially the 'conductor' of all traffic in the PE 150, while other embodiments split duties between the VM 160 and PE process 115. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A content synchronization method comprising:
    providing a private environment (PE) that comprises public cloud resource in a public cloud, a PE process, and at least one private server, the public cloud resource including cloud non-transitory mass storage memory, cloud computer processors, data services, at least one virtual machine (VM) that runs the PE process;

setting up a cloud data bucket in the public cloud and a server data bucket in the private server;

storing a data object in the cloud data bucket;

the public cloud asynchronously notifying the PE process that the data object is in the cloud data bucket;

after the notifying step, only if the PE process determines that the data object is not in the server data bucket then informing the at least one private server that the data object is in the cloud data bucket; and if the informing step occurs then the private server pulling a copy of the data object from the cloud data bucket and storing the data object in the server data bucket.

2. The method of claim 1 wherein the PE process determines the presence of the data object in the server data bucket by consulting a directory that is retained in the public cloud, the directory containing a record of the data object.

3. The method of claim 1 wherein the record is not maintained in the private server.

4. The method of claim 1 wherein the storing, the notifying, the informing and the pulling steps are accomplished without human intervention.

5. The method of claim 1 further comprising after the pulling step, making a new record that the data object is located in the server data bucket, the new record is not retained in the private server.

6. The method of claim 1 further comprising at the public cloud altering the data object into a new altered data object and repeating the notifying, the informing and the pulling steps with the new altered data object.

7. The method of claim 6 wherein the altering step is initiated automatically by a policy rule maintained in the public cloud for the cloud data bucket.

8. The method of claim 6 further comprising after the altering step, automatically deleting the data object based on an instruction from a policy rule maintained in the public cloud for the cloud data bucket.

9. The method of claim 1 further comprising:

loading a new data object in the server data bucket;

without any notifications of the new data object to the PE process, automatically sending a copy of the new data object from the server data bucket to the cloud data bucket and retaining the copy of the new data object in the server data bucket; and after the retaining step copy of the new data object repeat the notifying step with the copy of the new data object.

10. The method of claim 9 further comprising sending a record of the new data object to a directory that is retained in the public cloud, the record is not maintained in the private server.

11. The method of claim 1 wherein the copy of the data object is uniquely linked to data object content, the data object content is in the cloud data bucket but not in the server data bucket.

12. A data bucket synchronization method comprising:

providing a Private Environment (PE) that includes a public cloud and at least one private server, the private server comprising a server data bucket, the public cloud comprising a cloud data bucket, a virtual machine, and a PE process that is running on the virtual machine, the PE receiving a new data object;

if the new data object is received by the public cloud then issuing an asynchronous migration notification to the PE process that the new data object is stored to the cloud data bucket and only if the PE process determines that the new data object is not in the server data bucket then passing on the migration notification from the PE process to the at least one private server causing pulling a cloud copy of the new data object by the at least one private server from the cloud data bucket to the server data bucket;

if the new data object is received by the at least one private server and the at least one private server establishes that the new data object is not in the cloud data bucket then the at least one private server sending a server copy of the new data object to the cloud data bucket without any notifications from the PE process to the public cloud.

13. The method of claim 12 further comprising an end user entering the PE to access the new data object in at least one of the data buckets.

14. The method of claim 12 wherein the cloud data bucket and the server data bucket are virtualized storage space comprised of non-transient memory.

15. The method of claim 14 wherein the virtualized storage space is allocated to the PE.

16. The method of claim 12 wherein the PE process determines that the new data object is not in the server data bucket via directory information contained in a directory and wherein the at least one private server establishes that the new data object is not in the cloud data bucket via the directory information contained in the directory.

17. The method of claim 16 further comprising entering location records of where the new data object in the data buckets, the location records are maintained in the public cloud and are not maintained in the private server.

18. The method of claim 12 wherein the new data object is a modified version of a data object that exists in the cloud data bucket and the server data bucket.

19. A method for syncing multiple data buckets in a syncing operation, the method comprising:

providing a Private Environment (PE) that includes a public cloud possessing a cloud data bucket and at least one private server possessing a server data bucket;

if a new data object is stored to the cloud data bucket then commencing a cloud-to-server synchronization procedure that includes notifying the private server of the new data object in the cloud data bucket via a PE process running in the public cloud followed by the private server pulling a cloud copy of the new data object from the cloud data bucket into the server data bucket;

if the new data object is stored to the server data bucket then commencing a server-to-cloud synchronization procedure that includes sending server copy of the new data object from the server data bucket to the cloud data bucket, the server-to-cloud synchronization procedure does not include the PE process notifying the public cloud of the new data object.

20. The method of claim 19 wherein the notifying the private server of the new data object in the cloud data bucket is an asynchronous notification.

* * * * *